(12) United States Patent
Yakushiji et al.

(10) Patent No.: US 7,236,300 B2
(45) Date of Patent: Jun. 26, 2007

(54) TRANSMISSION TYPE SCREEN USING A FLY-EYE LENS

(75) Inventors: Kenichi Yakushiji, Niigata (JP); Keisuke Adachi, Niigata (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 203 days.

(21) Appl. No.: 10/980,864

(22) Filed: Nov. 3, 2004

(65) Prior Publication Data
US 2005/0162753 A1    Jul. 28, 2005

Related U.S. Application Data

(60) Provisional application No. 60/516,698, filed on Nov. 3, 2003.

(51) Int. Cl.
G03B 21/56   (2006.01)
G02B 5/32    (2006.01)
H04N 15/00   (2006.01)

(52) U.S. Cl. .................. 359/456; 359/460; 359/20; 348/59

(58) Field of Classification Search .............. 359/456, 359/443, 454–455, 460, 20; 348/59
See application file for complete search history.

(56) References Cited

U.S. PATENT DOCUMENTS

| | | | |
|---|---|---|---|
| 3,832,032 A * | 8/1974 | Shimada | ............... 359/456 |
| 4,165,154 A * | 8/1979 | Takahashi | ............ 359/455 |
| 4,666,248 A | 5/1987 | van de Ven | |
| 6,816,306 B2 * | 11/2004 | Freese et al. | ............... 359/456 |
| 6,829,087 B2 * | 12/2004 | Freese et al. | ............... 359/455 |

FOREIGN PATENT DOCUMENTS

| | | |
|---|---|---|
| JP | 62-157023 | 7/1987 |
| JP | 2000-111708 | 4/2000 |
| JP | 2000-131506 | 5/2000 |
| JP | 2003-121609 | 4/2003 |
| JP | 2003-215715 | 7/2003 |
| JP | 2003-295324 | 10/2003 |

OTHER PUBLICATIONS

Patent Abstracts of Japan, Publication No. 2000-131506 dated May 12, 2000, 1 pg.
Patent Abstracts of Japan, Publication No. 2000-111708 dated Apr. 21, 2000, 1 pg.

* cited by examiner

Primary Examiner—W. B. Perkey
Assistant Examiner—Magda Cruz
(74) Attorney, Agent, or Firm—Osha·Liang LLP

(57) ABSTRACT

A transmission type screen including a fly-eye lens having a convex shape on one side thereof and a light-shielding layer provided on an opposite side of a lens surface of the fly-eye lens and having a plurality of openings provided near each focus of lens unit cells, wherein if uniform light perpendicular to an optical axis of the lens unit cell is incident upon the lens surface, luminance on an emission side of the screen when the screen is observed from a direction inclined against the optical axis of the lens unit lens by a predetermined angle in a horizontal direction when the screen is used is larger than luminance when the screen is observed from a direction inclined by the same angle as that in the horizontal direction in a vertical direction when the screen is used.

14 Claims, 24 Drawing Sheets

TRANSMISSION TYPE SCREEN USING A FLY-EYE LENS

BACKGROUND OF THE INVENTION

This application claims the benefit of U.S. Provisional Application No. 60/516,698, filed Nov. 3, 2003, the disclosure of which is incorporated herein by reference.

1. Field of the Invention

The present invention relates to a transmission type screen. More, particularly, the present invention relates to a transmission type screen including a fly-eye lens.

2. Description of the Related Art

In prior arts, as a transmission type screen for projecting an optical image from an optical engine, one in which the viewing angle luminance distribution is widened by using a fly-eye lens (or microlens) having a lens unit cell of a rotation axis object has been proposed in Japanese Patent Application Laid-Open No. 2000-131506.

Moreover, the range of an observation angle to a screen is often different between horizontal and vertical directions at the time of observation. Accordingly, U.S. Pat. No. 4,666,248 and Japanese Patent Application Laid-Open No. 2000-111708 have proposed to individually control the viewing angle luminance distribution in the horizontal and vertical directions by forming the shape of the lens unit cell to be anamorphic or to have an arbitrarily curved surface, where it is asymmetrical in the horizontal and vertical directions.

Meanwhile, although the viewing angle luminance distribution is widened by enlarging the lens power of the lens unit cell, the luminance of a screen viewed from the front decreases. Moreover, while the observation angle to a screen is supposed to have a considerably wide range in the horizontal direction, it isn't so in the vertical direction. Consequently, for the shape of the lens unit cell, there is a proper range with respect to each of the horizontal and vertical directions. In the prior arts, however, any specific shapes of a lens unit cell are not present or suggested, and there is a problem that it is not always possible to obtain a screen of which the optical characteristics are ideal with respect to each of the horizontal and vertical directions.

SUMMARY OF THE INVENTION

Therefore, it is an object of the present invention to provide a transmission type screen, which is capable of overcoming the above drawbacks accompanying the conventional art. The above and other objects can be achieved by combinations described in the independent claims. The dependent claims define further advantageous and exemplary combinations of the present invention.

According to a first aspect of the present invention, there is provided a transmission type screen includes a fly-eye lens including lens unit cells each of which has a convex lens shape on one side thereof and a light-shielding layer provided on an opposite side of a lens surface of the fly-eye lens and having a plurality of openings provided near each focus of the lens unit cells, wherein a cross-section of each of the lens unit cells in a horizontal direction when the screen is used, the cross-section passing a center of each of the lens unit cells, is an arbitrary convex lens shape with respect to an area provided between a first lens curve, wherein when uniform light perpendicular to an optical axis of the lens unit cell is incident upon the lens surface, luminance on an emission side of the screen is highest in an optical axis direction of the lens unit cell, and a distance in the optical axis direction on the cross-section of the lens unit cell from an intersection between an effective lens surface of the lens unit cell and the optical axis to a boundary with an adjacent one of the lens unit cells is longest, and a second lens curve, wherein when the screen is observed on the emission side, luminance when the screen is observed from a direction inclined against the optical axis direction by a maximum horizontal viewing angle predetermined in a horizontal direction is a proportion of a reference, which is less than one, to luminance when the screen is observed from the optical axis direction, the area including the second lens curve, and a cross-section of each of the lens unit cells in a vertical direction when the screen is used, the cross-section passing the center of each of the lens unit cells, is an arbitrary convex lens shape with respect to an area provided between the second lens curve and a third lens curve, wherein when uniform light perpendicular to the optical axis is incident upon the lens surface, luminance on the emission side when the screen is observed from a direction inclined against the optical axis direction by a maximum vertical viewing angle, which is predetermined in the vertical direction and less than the maximum horizontal viewing angle, is a proportion of the reference as compared to the luminance when the screen is observed from the optical axis direction, the area not including the second lens curve.

The maximum horizontal viewing angle may be 27 degrees, the maximum vertical viewing angle may be 16 degrees, and the proportion of the reference may be 50%.

The first lens curve may correspond to a lens shape when a material of transparent plastic of which the index of refraction is relatively small is used for the fly-eye lens. In this case, the index of refraction is desirably 1.4.

The second lens curve may correspond to a lens shape when a material of transparent plastic of which the index of refraction is relatively large is used for the fly-eye lens. In this case, the index of refraction is desirably 1.65.

The third lens curve may correspond to a lens shape when a material of transparent plastic of which the index of refraction is relatively large is used for the fly-eye lens. In this case, the index of refraction is desirably 1.65.

If a material of transparent plastic of which the index of refraction is relatively small is used for the fly-eye lens, the second lens curve may be a lens shape in which the luminance when the screen is observed at a maximum viewing angle in the vertical direction is equal to or more than the proportion of the reference as compared to the luminance when observed from the optical axis direction. In this case, the index of refraction is desirably 1.4.

If a lens pitch $P_r$ of the fly-eye lens and a distance from a central axis of each of the lens unit cells are represented by Pr and r respectively, the first, second and third lens curves may be respectively defined as each of first, second and third parameter groups shown in the following table and the following equation.

$$z_r = \sum_{k=1}^{15} a_k \left(\frac{1}{P_r}\right)^{2k-1} r^{2k}$$

| | $a_k$ | | |
|---|---|---|---|
| k | 1st parameter groups (defining 1st lens curve) | 2nd parameter groups (defining 2nd lens curve) | 3rd parameter groups (defining 3rd lens curve) |
| 1 | 1.852E+00 | 7.692E−01 | 3.448E−01 |
| 2 | 1.842E+00 | 6.827E−01 | 1.435E−01 |
| 3 | 3.663E+00 | 1.212E+00 | 1.194E−01 |
| 4 | 9.108E+00 | 2.689E+00 | 1.243E−01 |
| 5 | 2.536E+01 | 6.683E+00 | 1.448E−01 |
| 6 | 7.567E+01 | 1.780E+01 | 1.808E−01 |
| 7 | 2.365E+02 | 4.964E+01 | 2.365E−01 |
| 8 | 7.644E+02 | 1.432E+02 | 3.199E−01 |
| 9 | 2.534E+03 | 4.237E+02 | 4.437E−01 |
| 10 | 8.569E+03 | 1.279E+03 | 6.279E−01 |
| 11 | 2.944E+04 | 3.920E+03 | 9.027E−01 |
| 12 | 1.025E+05 | 1.218E+04 | 1.315E+00 |
| 13 | 3.606E+05 | 3.825E+04 | 1.936E+00 |
| 14 | 1.281E+06 | 1.212E+05 | 2.878E+00 |
| 15 | 4.585E+06 | 3.874E+05 | 4.312E+00 |

Here, $Z_r$ is a distance from a vertex of the lens in the optical axis direction, and k is a number ranging from 1 to 15 corresponding to each of items in the above table.

The transmission type screen may further include a Fresnel lens facing the lens surface of the fly-eye lens.

An antireflection coating may be formed on the emission side of the fly-eye lens. An antireflection may further be formed on the incident side of the fly-eye lens. Alternatively, an antireflection coating may be formed only on the incident side if the fly-eye lens.

According to a second aspect of the present invention, there is provided a transmission type screen includes a fly-eye lens including lens unit cells each of which has a convex lens shape on one side thereof and a light-shielding layer provided on an opposite side of a lens surface of the fly-eye lens and having a plurality of openings provided near each focus of the lens unit cells, wherein if uniform light perpendicular to an optical axis of the lens unit cell is incident upon the lens surface, luminance on an emission side of the screen when the screen is observed from a direction inclined against the optical when the screen is used is larger than luminance when the screen is observed from a direction inclined by the same angle as that in the horizontal direction in a vertical direction when the screen is used.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
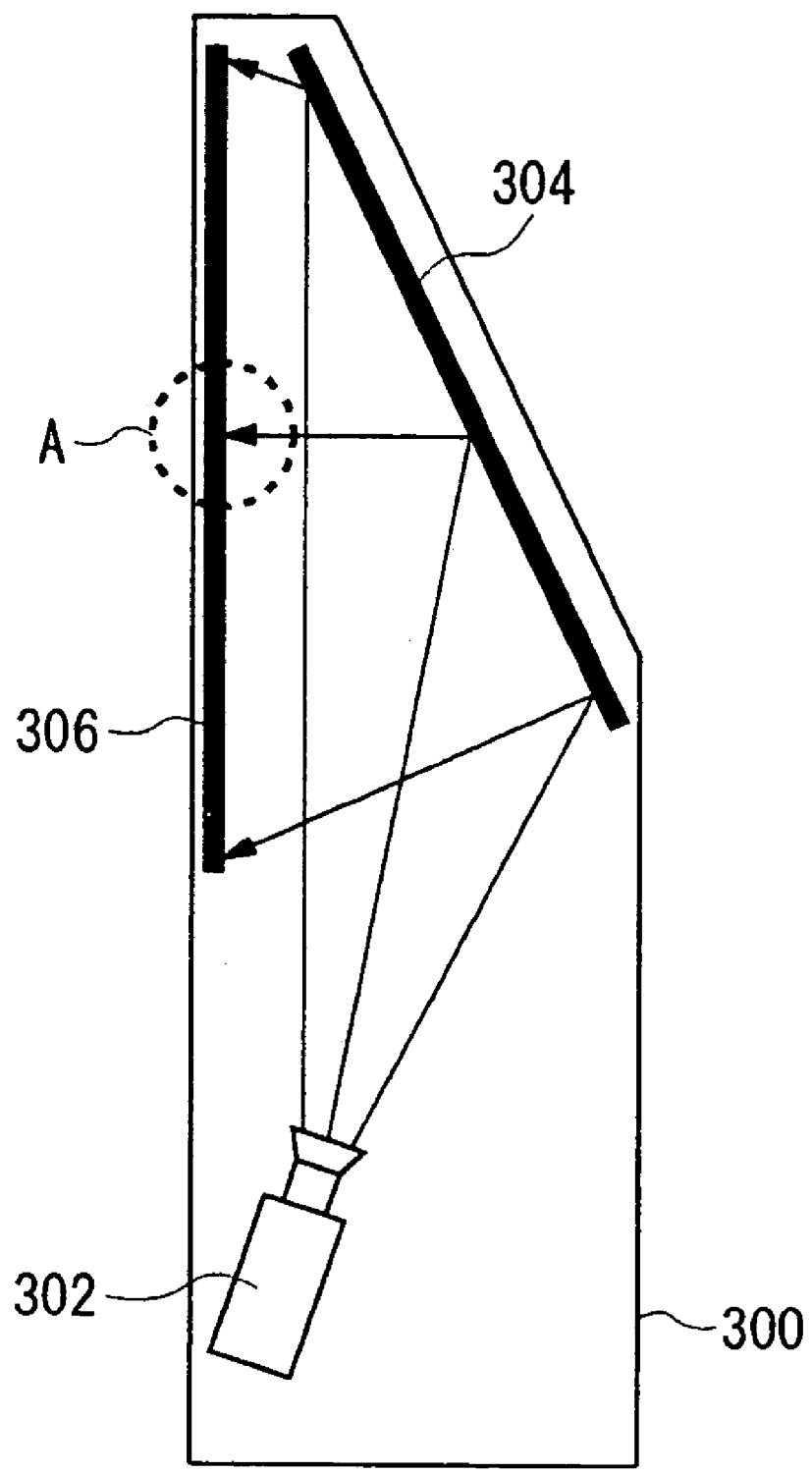
FIG. 1 is a drawing showing the configuration of a rear projection display 300 related to an exemplary embodiment of the present invention.

FIG. 1 shows the configuration of a rear projection display 300 related to an exemplary embodiment of the present invention. The rear projection display 300 includes an optical engine 302, a mirror 304, and a transmission type screen 306. An optical image output from the optical engine 302 is reflected by the mirror 304 and incident on the transmission type screen 306. The transmission type screen 306 realizes a proper observation area by diffusing and emitting the incident optical image towards an observer side.

At this time, the transmission type screen 306 of the present embodiment has the observation area in the horizontal direction at the time of use (observation) which is wider than that in a vertical direction. In other words, the luminance when a screen is viewed from a direction which is inclined at a certain angle in the horizontal direction is higher than that when the screen is viewed from a direction which is inclined at the same angle in the vertical direction. Further, when the screen is viewed from a direction perpendicular to a face thereof, the luminance of the screen is the highest. Consequently, the transmission type screen 306 accomplishes a sufficient level of viewing angle luminance distribution individually in each of the horizontal and vertical directions.

Figure 2:
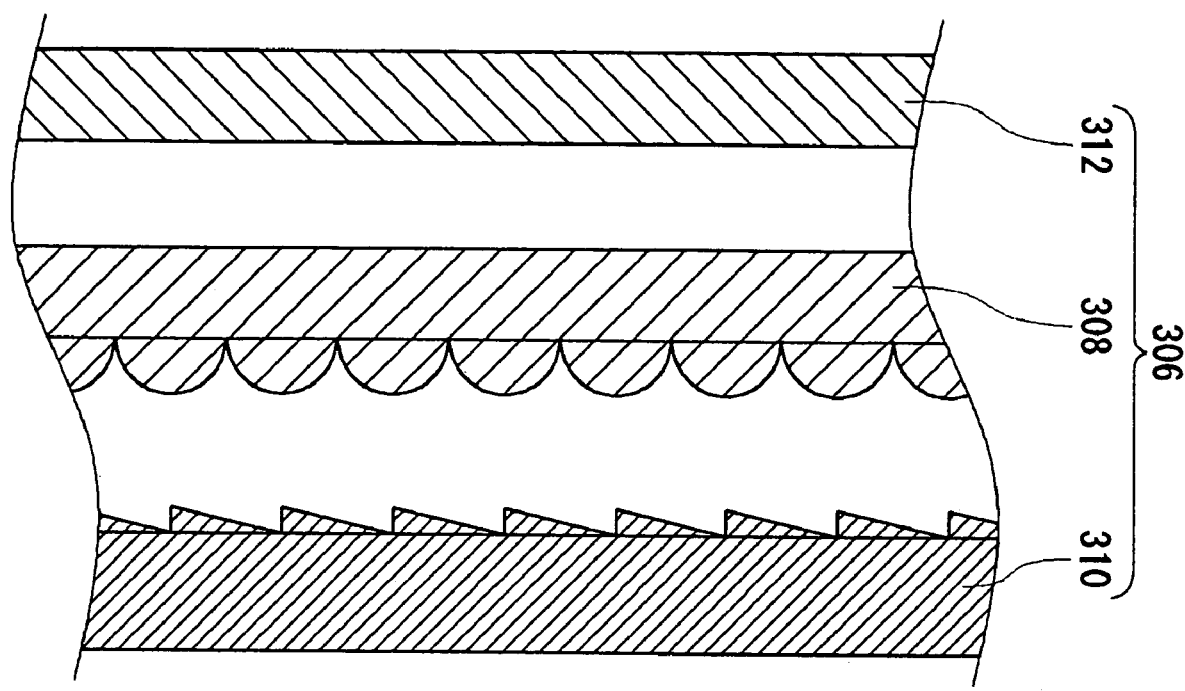
FIG. 2 is a drawing showing the configuration of a transmission type screen 306.

FIG. 2 shows the detailed configuration of an A section of the transmission type screen 306 in FIG. 1. The transmission type screen 306 includes a Fresnel lens 310, a fly-eye lens unit 308, and a front plate 312. The Fresnel lens 310 collimates the traveling directions of the light emitted from the optical engine 302 respect to an optical axis direction of the fly-eye lens unit 308. The fly-eye lens unit 308 diffuses the incident light at an individual angle for each of the horizontal and vertical directions. Moreover, the front plate 312 protects the fly-eye lens unit 308 and reduces the reflection of external light by anti-glare treatment such as an AR coating performed on a surface.

Figure 3:
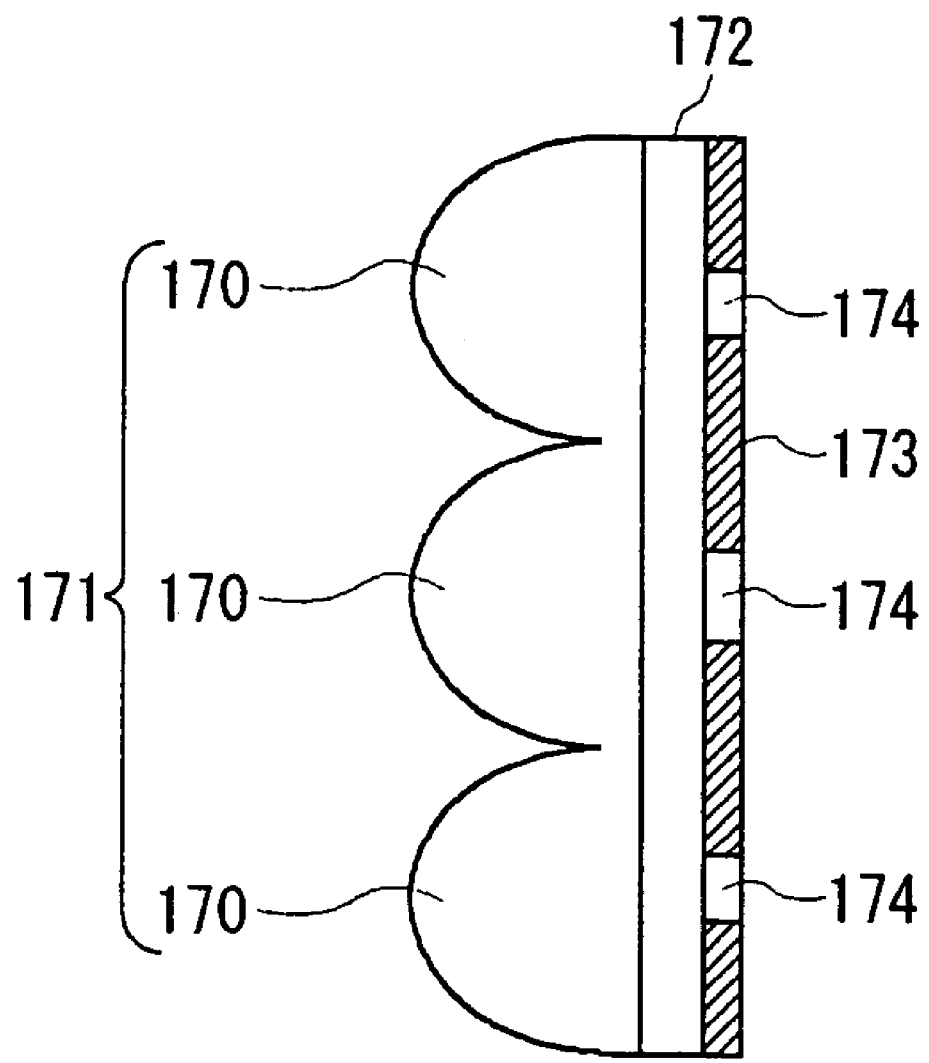
FIG. 3 is a drawing showing the configuration of a fly-eye lens unit 308.

FIG. 3 shows the configuration of the fly-eye lens unit 308. The fly-eye lens unit 308 includes a fly-eye lens 171 in which a plurality of lens unit cells 170 having a convex lens shape on one surface thereof is arranged in an adjacent manner, a base material 172 for supporting the fly-eye lens 171, and a light-shielding layer 173 provided on an opposite side of the base material 172 to the fly-eye lens 171. The light-shielding layer 173 includes a plurality of openings 174 positioned near the focus of each of the lens unit cells 170. Further, the light-shielding layer 173 is provided more closely to the observer side (emission side) than the lens unit cell 170. Therefore, the shape of the lens of the lens unit cell 170 is required to focus the incident light more closely to the observer side (emission side) than the lens unit cell 170.

As the material of the fly-eye lens 171 is used, a material of which the index of refraction ranges approximately from 1.4 to 1.65 is used among ones transmitting at least visible light. If one of which the index of refraction is less than 1.4 is used, the lens unit cell 170 cannot have a sufficient lens power and diffuse the incident light at a proper angle. On the contrary, if one of which the index of refraction is more than 1.65 is used, the light incident on the lens unit cell 170 is internally reflected due to the shape of the lens, and the transmission efficiency as a screen decreases. Since there are a lot of materials of which the index of refraction ranges from 1.4 to 1.65 in plastic and glass, it is desirable that the material for the fly-eye lens 171 is selected according to the manufacturing method or material cost. The method of manufacturing the fly-eye lens unit 308 will be described later. Further, if a material of which the index of refraction is 1.4 or 1.65 is used, the index of refraction might fall below 1.4 or exceed 1.65 due to the variation in the material properties. Such variation lies within an acceptable range of the present embodiment. Although the range of the variation is different according to the kind of material or the material manufacturer, it is approximately 1.4±0.05 and 1.65±0.05.

Figure 4:
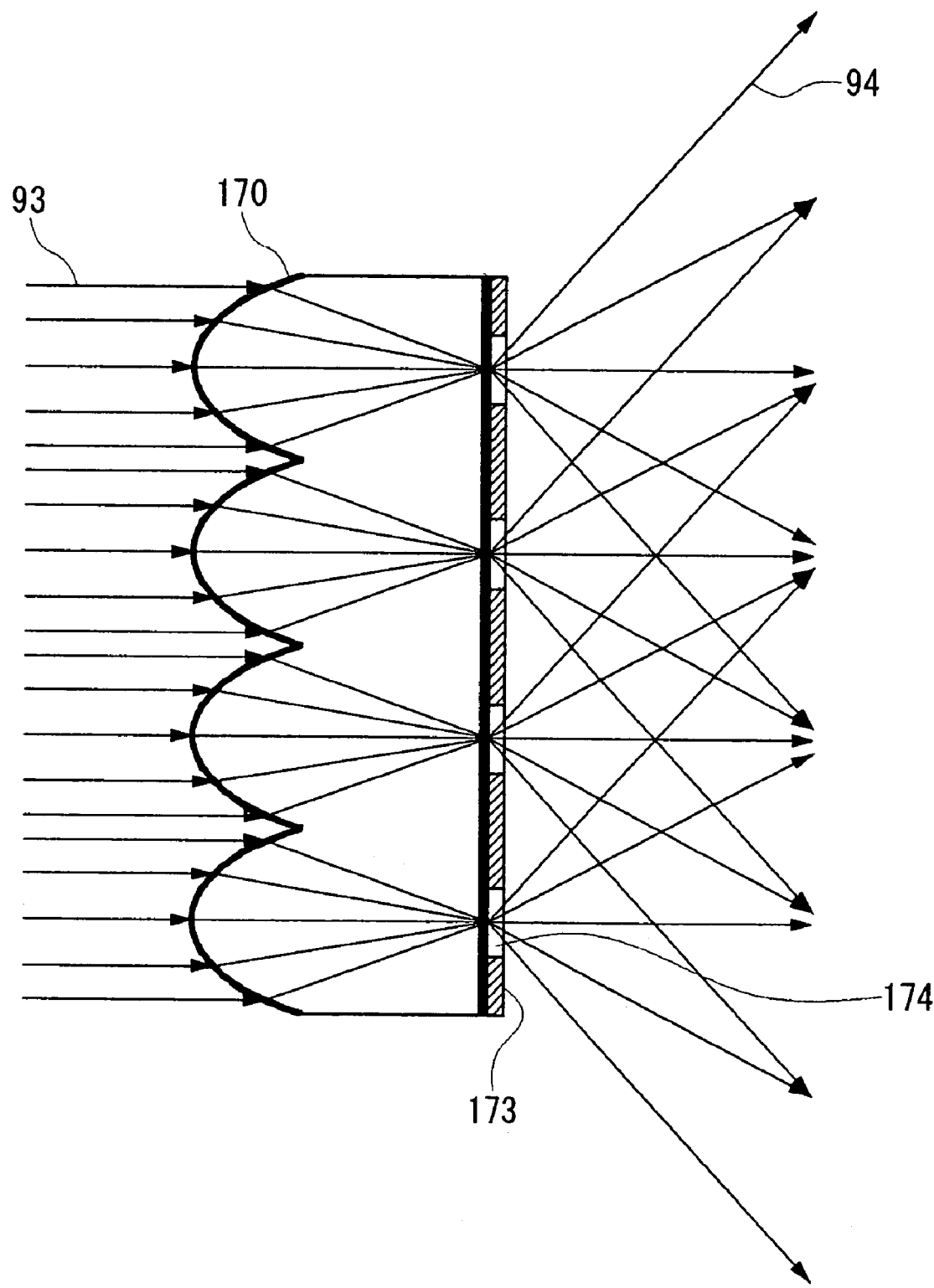
FIG. 4 is a drawing showing the paths of rays of light with respect to the fly-eye lens unit 308.

FIG. 4 shows the paths of rays of light with respect to the fly-eye lens unit 308. The incident light 93 substantially parallel to an optical axis of the lens unit cell 170 from a lens surface of the lens unit cell 170 is refracted at an angle corresponding to the shape of the incidence surface of the lens, concentrated on the focus existing at the optical axis of the lens unit cell 170, and emitted from the opening 174 of the light-shielding layer 173. The light-shielding layer 173 has the minimum-sized openings 174 allowing the emitted light 94 to pass through them near the focuses of the lens unit cells 170. Therefore, it is possible to selectively allow only the ray of light which should be emitted to pass and shield external light which causes noise. Accordingly, the transmission type screen 306 can project an image of high contrast to an observer side.

Hereafter, the shape of the lens unit cell 170 will be described.

Figure 5:
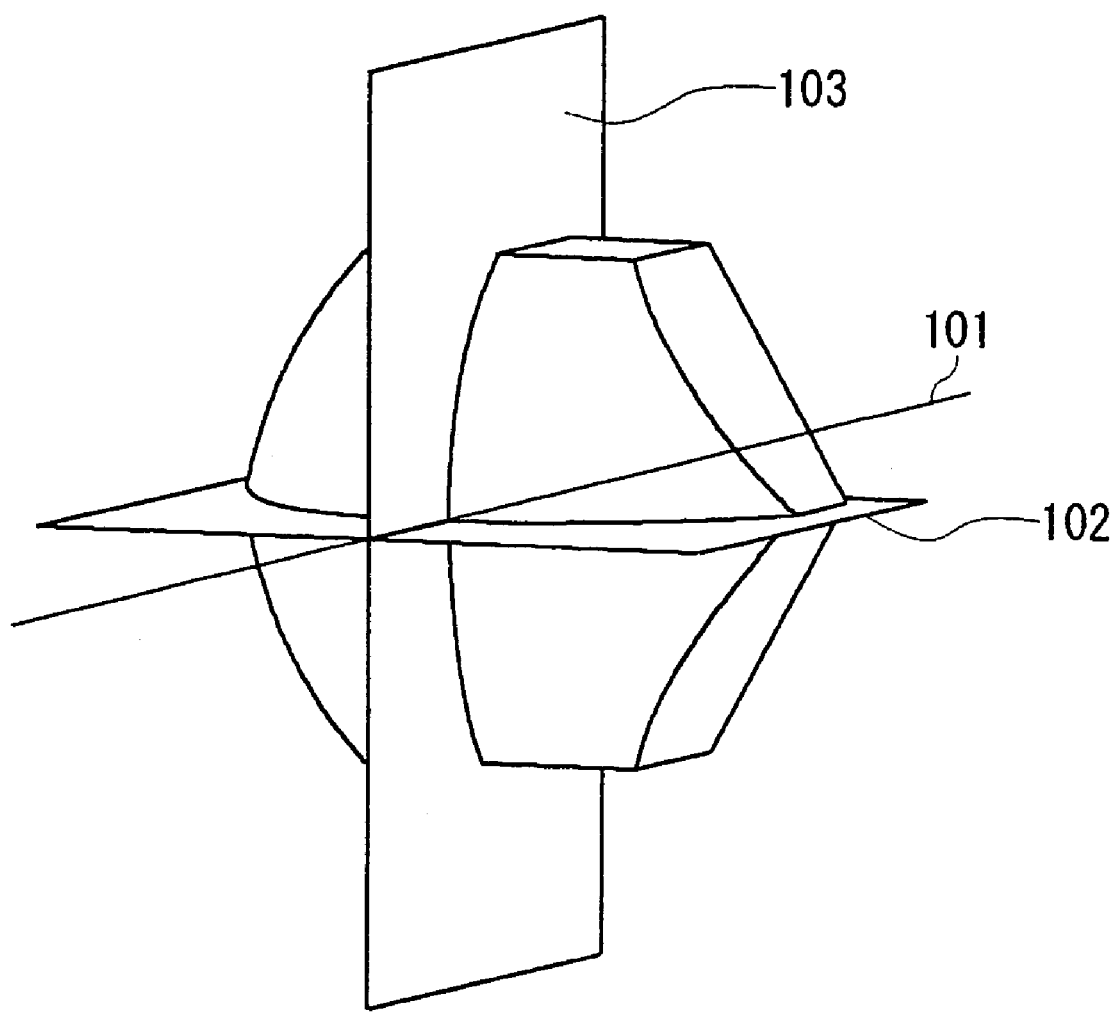
FIG. 5 is a perspective view exemplary showing a lens unit cell 170.

FIG. 5 is a perspective view exemplary showing the lens unit cell 170. The shape of the effective lens surface of the lens unit cell 170 is defined mainly by cross-sections on a horizontal plane 102 passing an optical axis 101 of the lens unit cell 170 and a vertical plane 103 passing the same optical axis 101. It is desirable that the shape of the lens between the horizontal plane 102 and the vertical plane 103 is smoothly complemented so that an inflection point does not occur on a curved surface of the lens.

Figure 6:
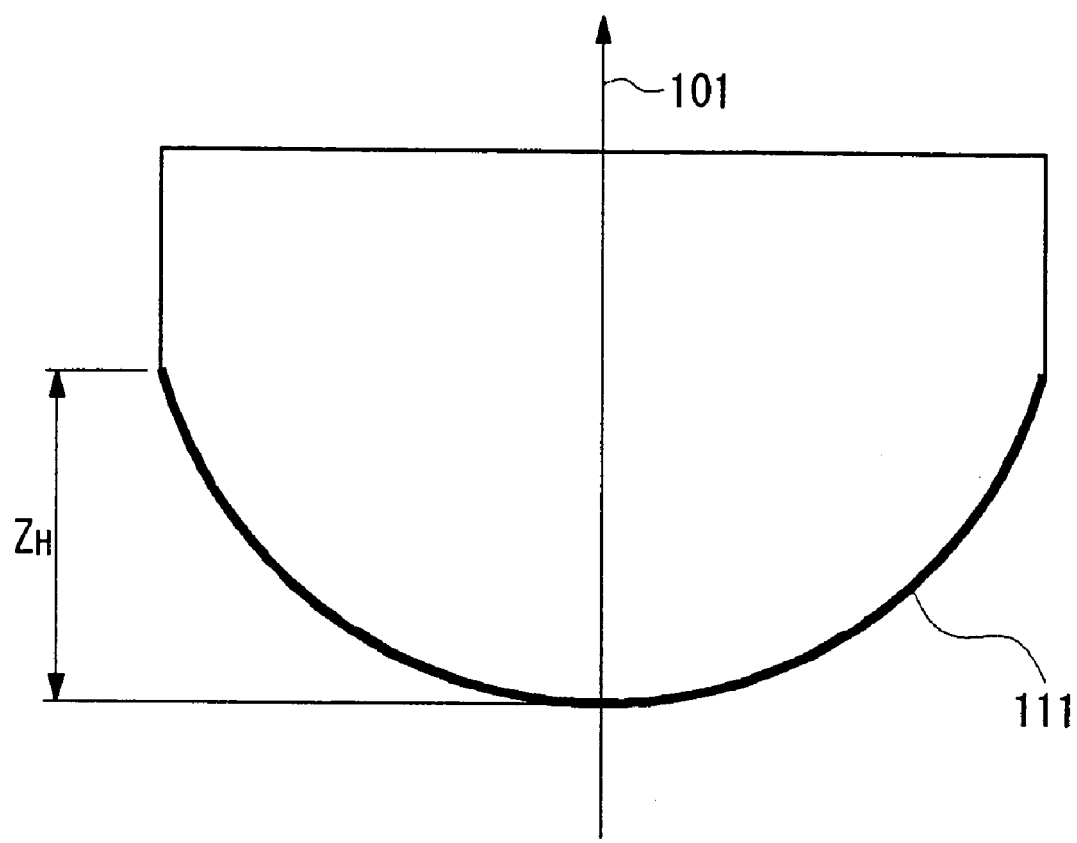
FIG. 6 is a drawing showing a cross-section in the horizontal direction of the lens unit cell 170.

FIG. 6 shows a cross-section of the lens unit cell 170 in the horizontal direction. The horizontal cross-section 111 has a curved line where the effective lens surface of the lens unit cell 170 crosses the horizontal plane 102. The viewing angle luminance distribution of the lens unit cell 170 in the horizontal direction is determined by the shape of the horizontal cross-section 111 and the index of refraction of the lens material. Accordingly, for the horizontal cross-section 111, if the distance in the direction of the optical axis 101 from the intersection with the optical axis 101 to the boundary with an adjacent lens unit cell 170 is represented by $Z_H$ and the lens pitch is fixed, the longer the $Z_H$ is, the larger the lens power in the horizontal direction of the lens unit cell 170 is.

Figure 7:
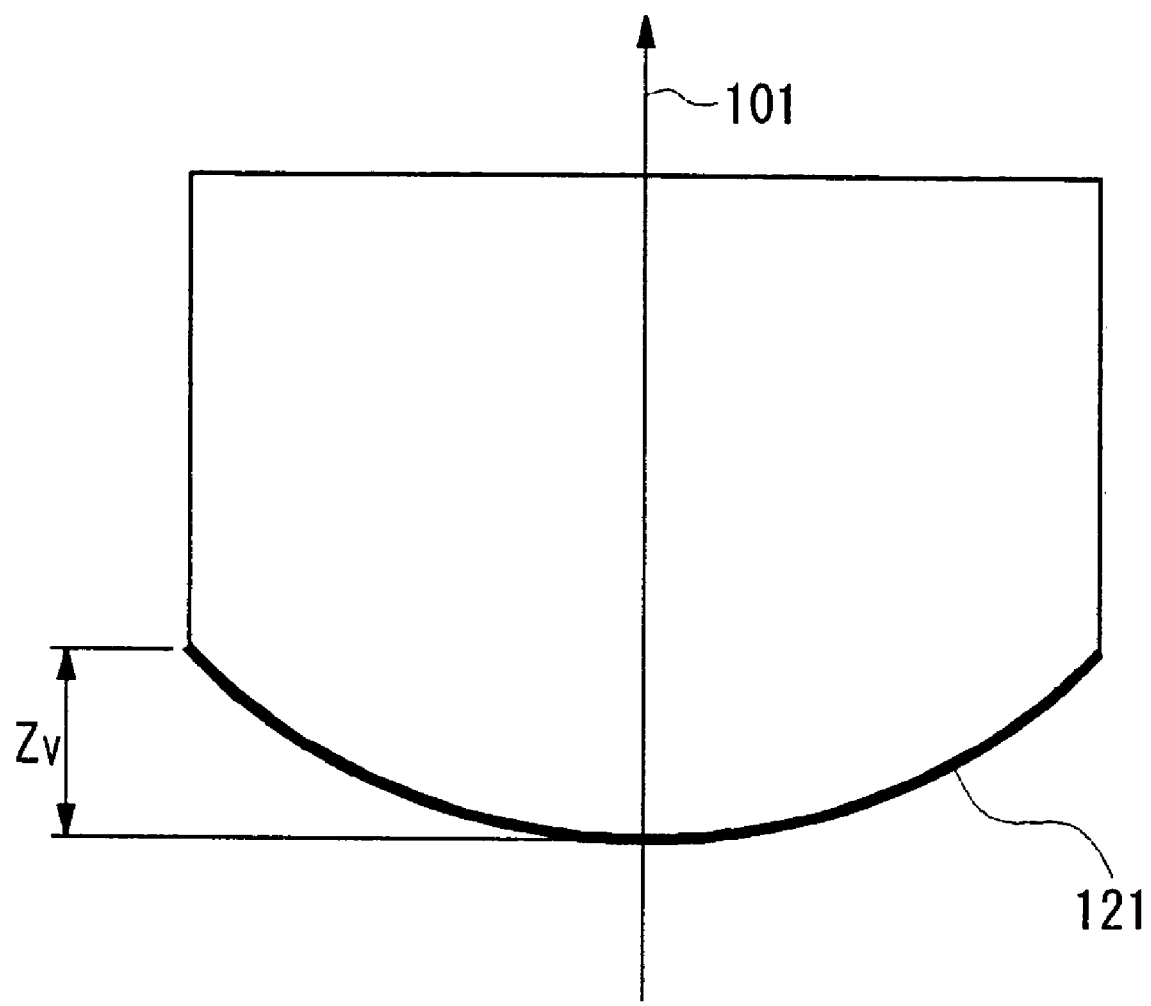
FIG. 7 is a drawing showing a cross-section in the vertical direction of the lens unit cell 170.

FIG. 7 shows a cross-section of the lens unit cell 170 in the vertical direction. The vertical cross-section 121 has a curved line where the effective lens surface of the lens unit cell 170 crosses the vertical plane 103. The viewing angle luminance distribution of the lens unit cell 170 in the vertical direction is determined by the shape of the vertical cross-section 121 and the index of refraction of the lens material. Accordingly, for the vertical cross-section 121, if the distance in the direction of the optical axis 101 from the intersection with the optical axis 101 to the boundary with an adjacent lens unit cell 170 is represented by $Z_V$ and the lens pitch is fixed, the longer the $Z_V$ is, the larger the lens power in the vertical direction of the lens unit cell 170 is.

Here, for the lens unit cell 170 of the present embodiment, the following equation is established:

$Z_H > Z_V$.

Accordingly, the lens power in the horizontal direction is larger than that in the vertical direction, and it is possible to obtain a larger observation area in the horizontal direction than that in the vertical direction.

However, if the lens power exceeds a predetermined value, the transmission efficiency as a screen decreases.

Figure 8:
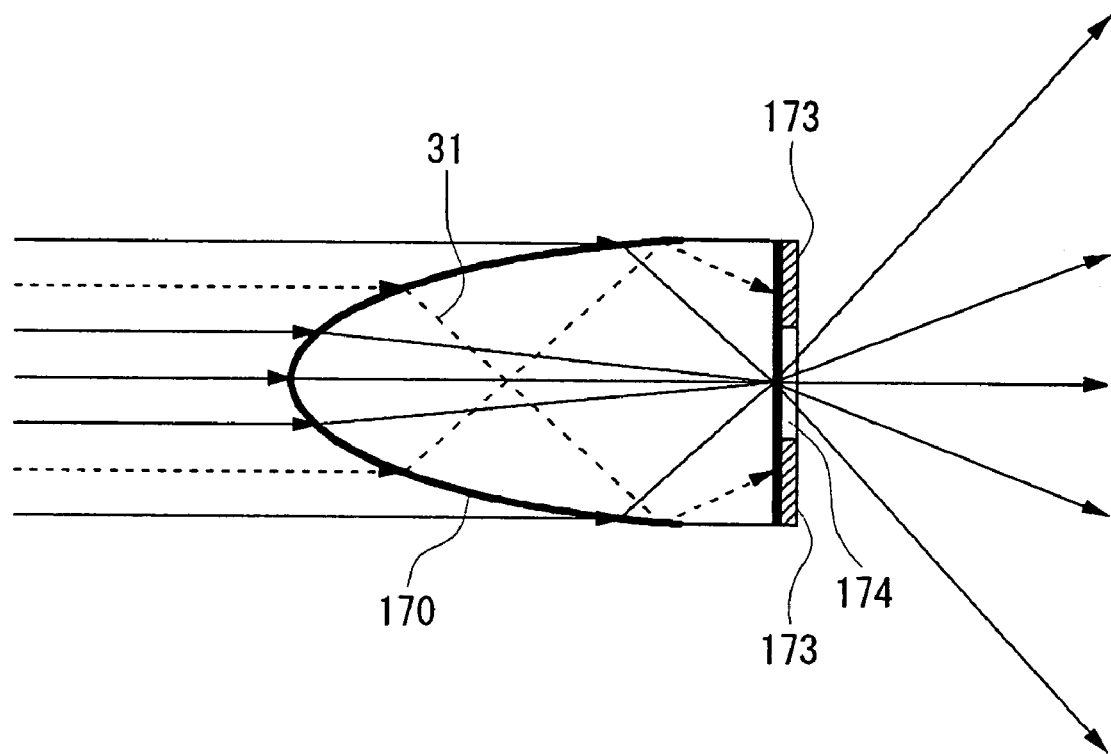
FIG. 8 is a drawing showing the paths of rays of light when the lens power of the lens unit cell 170 is too strong.

FIG. 8 shows the paths of rays of light when the lens power of the lens unit cell 170 is too strong. For the lens unit cell 170 in this drawing, the distance in the optical axis direction from the intersection of the effective lens surface and the optical axis to the boundary with an adjacent lens unit cell 170 is larger than an upper limit which will be described later. In this case, a ray of light 31 shown as a dotted arrow among rays of incident light is reflected inside the lens after entering the lens unit cell 170, so it cannot be emitted from the opening 174 but interrupted by the light-shielding layer 173. Consequently, the transmission efficiency as a screen decreases, and the luminance with respect to an observation surface is reduced.

Meanwhile, if the lens power of the lens unit cell 170 is too small, the incident light cannot be diffused at a sufficient angle.

Figure 9:
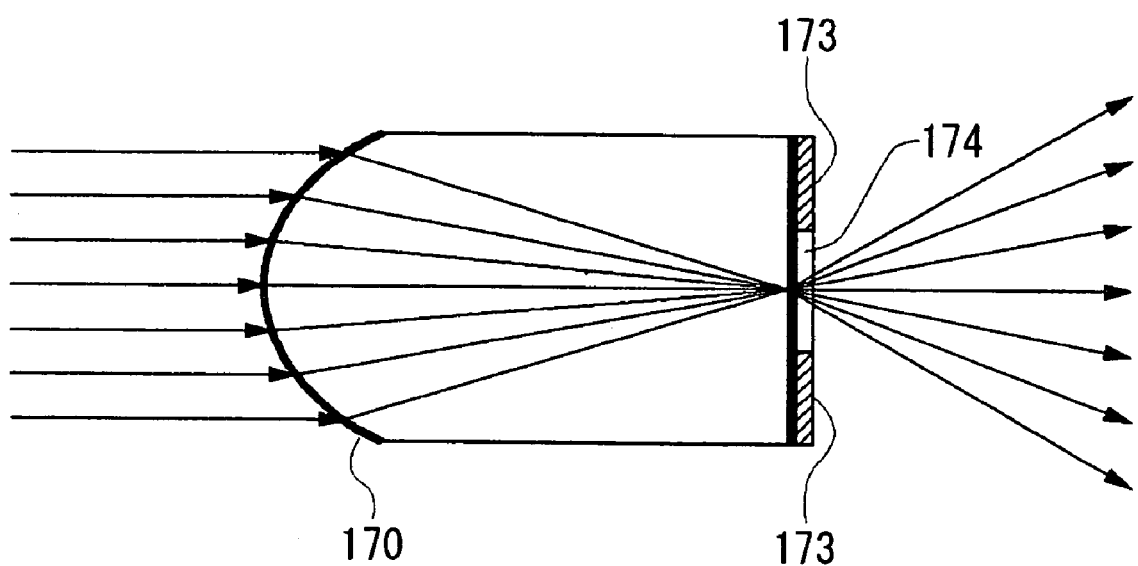
FIG. 9 is a drawing showing the paths of rays of light when the lens power of the lens unit cell 170 is insufficient.

FIG. 9 shows the paths of rays of light when the lens power of the lens unit cell 170 is insufficient. For the lens unit cell 170 in this drawing, the distance in the optical axis direction from the intersection of the effective lens surface and the optical axis to the boundary with an adjacent lens unit cell 170 is smaller than a lower limit which will be described later. In this case, the incident light is emitted through the opening 174, while it is not diffused at a sufficient angle.

Therefore, in order for the transmission type screen 306 to individually accomplish a sufficient level of viewing angle luminance distribution for each of the horizontal and vertical directions, it is required to form the shape of the effective lens surface of the lens unit cell 170 to be within a predetermined area.

Here, it is important to optimize the viewing angle luminance distribution required for a screen within a range of a condition under which the screen is used.

Figure 10:
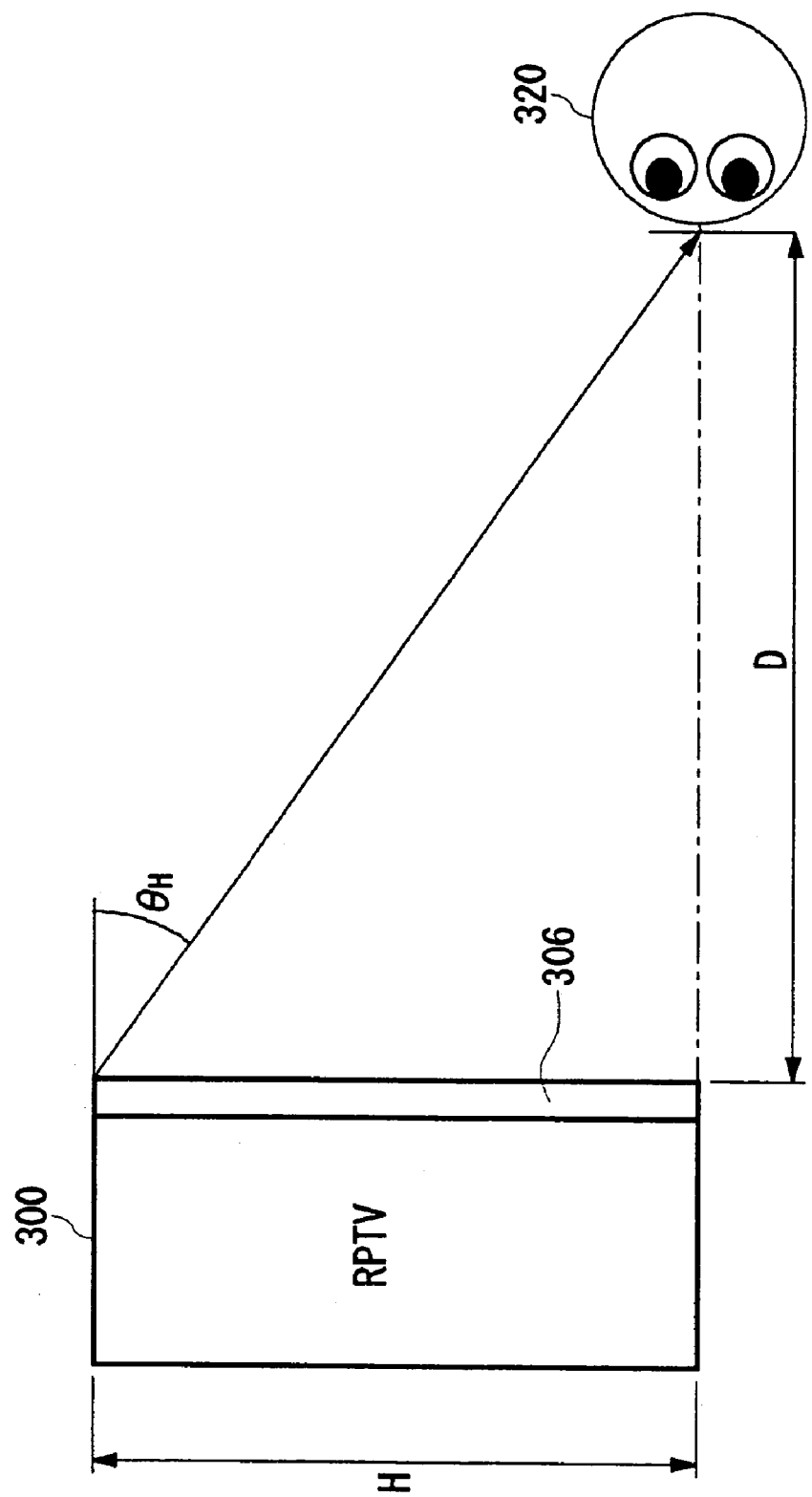
FIG. 10 is a drawing showing an observation state in the horizontal direction of the rear projection display 300.

FIG. 10 shows an observation state in the horizontal direction of the rear projection display 300. It is assumed that an observer 320, who is apart from one end in the horizontal direction of the transmission type screen 306 by a distance D in a direction perpendicular to a face of the transmission type screen 306, observes the other end in the horizontal direction of the transmission type screen 306. Accordingly, if the observation angle of the transmission type screen 306 in this case is considered as a maximum horizontal viewing angle $\theta_H$ in the horizontal direction, it is required for the transmission type screen 306 to have a sufficient level of luminance within an observation range from the observation angle of 0 degree to the maximum horizontal viewing angle $\theta_H$ in the horizontal direction. Specifically, the luminance when the screen is viewed from the maximum horizontal viewing angle $\theta_H$ in the horizontal direction is required to be equal to or more than 50% of that when the screen is viewed from the observation angle of 0 degree, that is, in the optical axis direction.

Figure 11:
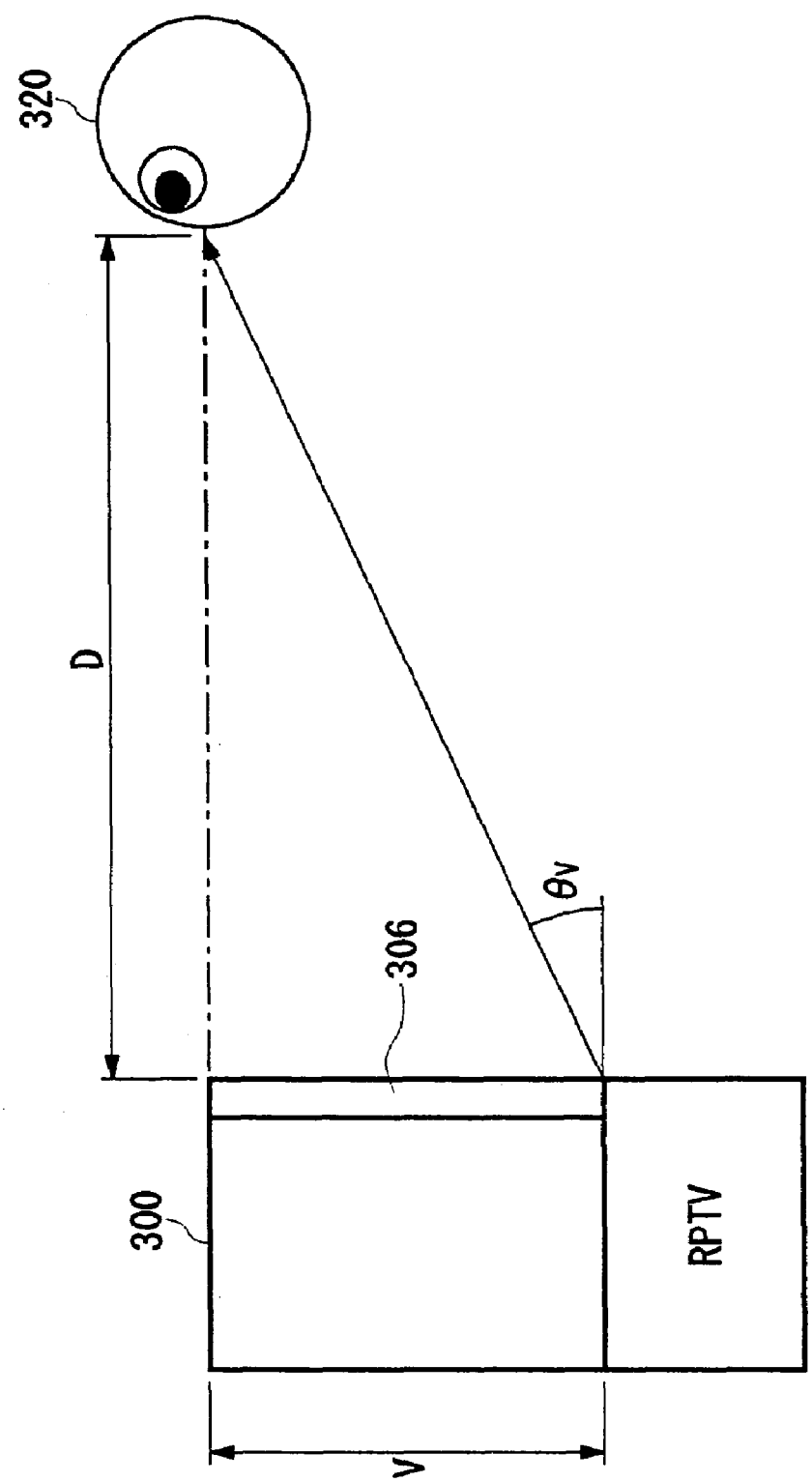
FIG. 11 is a drawing showing an observation state in the vertical direction of the rear projection display 300.

Meanwhile, FIG. 11 shows an observation state in the vertical direction of the rear projection display 300. It is assumed that the observer 320, who is apart from one end in the horizontal direction of the transmission type screen 306 by a distance D in a direction perpendicular to a face of the transmission type screen 306, observes the other end in the vertical direction of the transmission type screen 306. Accordingly, if the observation angle of the transmission type screen 306 in this case is considered as a maximum vertical viewing angle $\theta_V$ in the vertical direction, it is required for the transmission type screen 306 to have a sufficient level of luminance within an observation range from the observation angle of 0 degree to the maximum vertical viewing angle $\theta_V$ in the vertical direction. Specifically, it is desirable that the luminance when the screen is viewed from the maximum vertical viewing angle $\theta_V$ in the vertical direction is about 50% of that when the screen is viewed from the observation angle of 0 degree, that is, in the optical axis direction.

Moreover, for a 16:9 wide screen which is a mainstream screen, since a horizontal size H is larger than a vertical size V, the maximum horizontal viewing angle $\theta_H$ is larger than maximum vertical viewing angle $\theta_V$. That is, the observation area in the horizontal direction required for the transmission type screen 306 at a minimum is wider than that in the vertical direction.

Further, in the present embodiment, it is assumed that a screen which is 70 inches wide is observed at an observation distance of 3 meters. In this case, the maximum horizontal and vertical viewing angles $\theta_H$ and $\theta_V$ are 27 and 16 degrees respectively. If the screen size is larger than 70 inches, the observation distance is lengthened in proportion to the expansion of the screen size, while $\theta_H$ and $\theta_V$ are constant. On the other hand, if the screen size is smaller than 70 inches, the observation distance is shortened in proportion to the shrinkage of the screen size, while $\theta_H$ and $\theta_V$ are constant. From the observation distance determined as described above, with respect to the observation from a farther position, the screen has a particularly excellent viewing angle luminance distribution.

Figure 12:
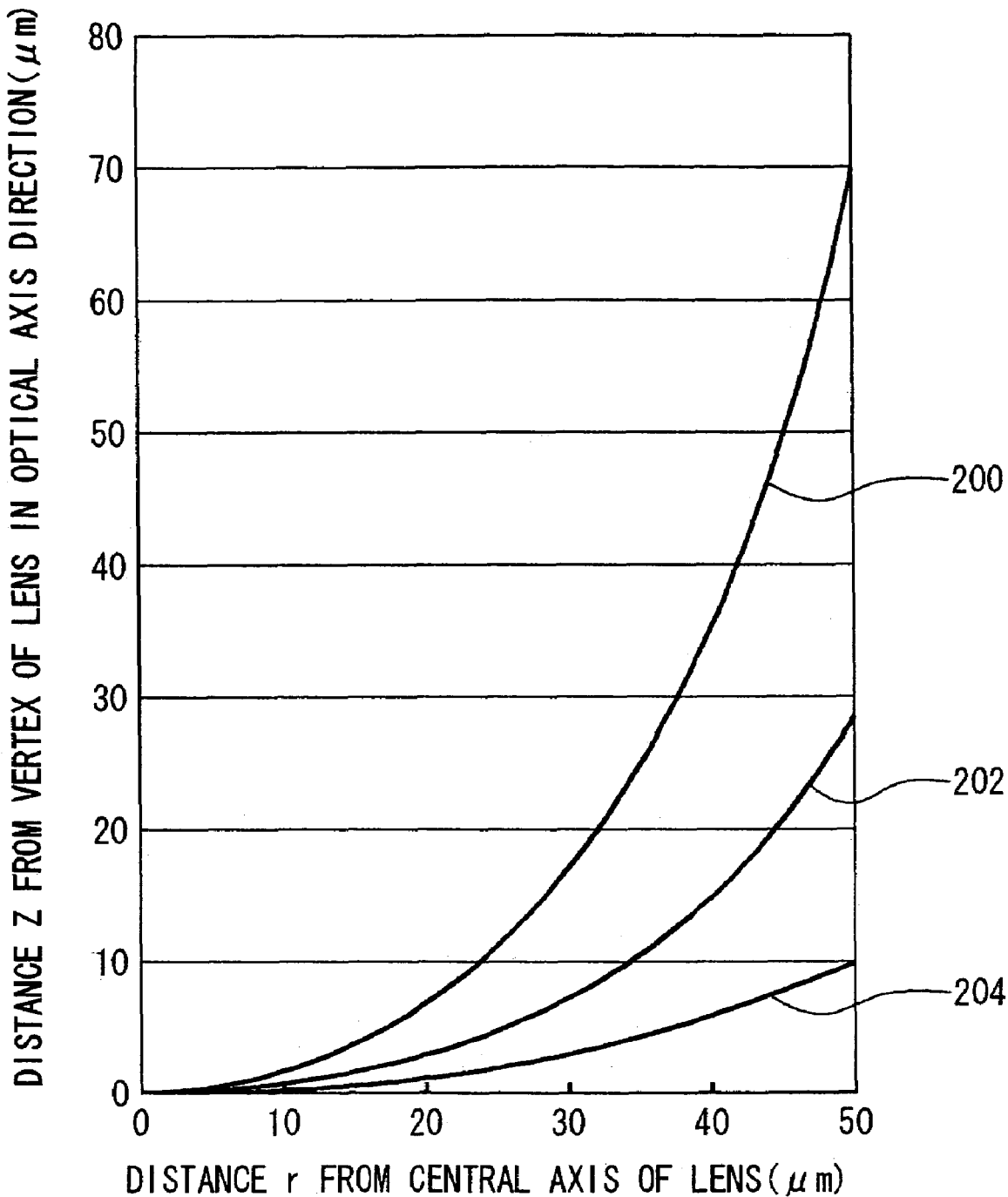
FIG. 12 is a drawing showing a range of the lens shape of the lens unit cell 170.

FIG. 12 is a drawing showing a range of half the shape of a cross-section of the lens unit cell 170 passing the optical axis when lens pitch $P_r$ is 100 micrometers. The vertical axis is matched with the optical axis of the lens unit cell 170 and represents the distance Z in the optical axis direction from the vertex of the lens. The horizontal axis represents the distance r from the central axis (optical axis) of the lens. The origin (0, 0) of the horizontal and vertical axes is the intersection of the effective lens surface and the optical axis of the lens unit cell 170.

A first lens curve 200 is a shape of the lens unit cell 170, where the lens power of the lens unit cell 170 is the maximum, and if uniform light parallel to the optical axis is incident from a surface of the lens, the luminance in the optical axis direction of the screen with respect to the emission side is the maximum, and the distance in the optical axis direction from the intersection (0, 0) of the effective lens surface and the optical axis to the boundary of the cross-section of the lens with an adjacent lens unit cell is the maximum.

The second lens curve 202 is a shape of the lens unit cell 170, where if the screen is observed at the emission side, the luminance when the screen is observed from a direction inclined to the optical axis direction by the predetermined maximum horizontal viewing angle in the horizontal direction is a proportion of a reference which is smaller than one, as compared to that when the screen is observed from the optical axis direction. Here, the maximum horizontal viewing angle is 27 degrees as described above, and the proportion of the reference is 50% as described above.

The third lens curve 204 is a shape of the lens unit cell 170, where if uniform light parallel to the optical axis is incident from a surface of the lens, the luminance when the screen is observed from a direction inclined to the optical axis direction by the maximum vertical viewing angle, which is predetermined in the vertical direction with respect to the emission side and smaller than the maximum horizontal viewing angle in the horizontal direction, is a proportion of the reference, as compared to that when the screen is observed from the optical axis direction. Here, the maximum vertical viewing angle is 16 degrees as described above, and the proportion of the reference is 50% as described above.

In the horizontal direction when the screen is used, the shape of the cross-section of the lens passing the center of the lens unit cell 170 is a convex lens shape with respect to an area provided between the first and second lens curves 200 and 202 and including the second lens curve 202.

Accordingly, the lens unit cell 170 can achieve a viewing angle luminance distribution having a sufficient luminance level in the horizontal direction.

Moreover, in the vertical direction when the screen is used, the shape of the cross-section of the lens passing the center of the lens unit cell 170 is a convex lens shape with respect to an area provided between the second and third lens curves 202 and 204 and not including the second lens curve 202. Accordingly, the lens unit cell 170 can achieve a viewing angle luminance distribution where the luminance level is neither excessive nor insufficient in the vertical direction, and particularly have a high level of luminance in the front direction of the screen.

If the lens pitch of the fly-eye lens 171 and the distance from the central axis of each lens unit cell 170 are represented by Pr and r respectively, each of the first, second and third lens curves 200, 202 and 204 are defined as each of first, second and third parameter groups shown in the following table and the following equation.

$$z_r = \sum_{k=1}^{15} a_k \left(\frac{1}{P_r}\right)^{2k-1} r^{2k}$$

| | $a_k$ | | |
|---|---|---|---|
| k | 1st parameter groups (defining 1st lens curve) | 2nd parameter groups (defining 2nd lens curve) | 3rd parameter groups (defining 3rd lens curve) |
| 1 | 1.852E+00 | 7.692E−01 | 3.448E−01 |
| 2 | 1.842E+00 | 6.827E−01 | 1.435E−01 |
| 3 | 3.663E+00 | 1.212E+00 | 1.194E−01 |
| 4 | 9.108E+00 | 2.689E+00 | 1.243E−01 |
| 5 | 2.536E+01 | 6.683E+00 | 1.448E−01 |
| 6 | 7.567E+01 | 1.780E+01 | 1.808E−01 |
| 7 | 2.365E+02 | 4.964E+01 | 2.365E−01 |
| 8 | 7.644E+02 | 1.432E+02 | 3.199E−01 |
| 9 | 2.534E+03 | 4.237E+02 | 4.437E−01 |
| 10 | 8.569E+03 | 1.279E+03 | 6.279E−01 |
| 11 | 2.944E+04 | 3.920E+03 | 9.027E−01 |
| 12 | 1.025E+05 | 1.218E+04 | 1.315E+00 |
| 13 | 3.606E+05 | 3.825E+04 | 1.936E+00 |
| 14 | 1.281E+06 | 1.212E+05 | 2.878E+00 |
| 15 | 4.585E+06 | 3.874E+05 | 4.312E+00 |

Here, $Z_r$ is the distance from the vertex of the lens in the optical axis direction, and k is a number corresponding to each term from 1 to 15 in the above table.

Figure 13:
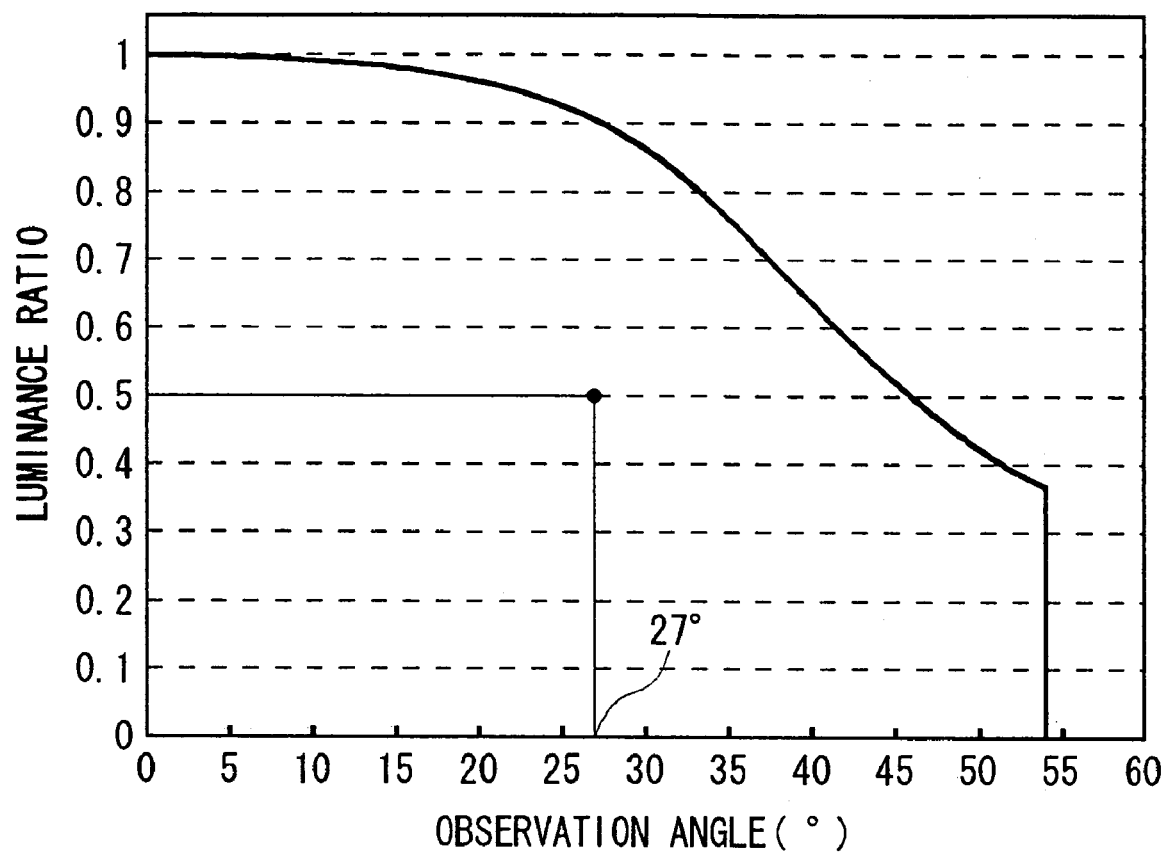
FIG. 13 is a graph showing the viewing angle luminance distribution, where the index of refraction is 1.4 with a first lens curve 200.

FIG. 13 is a graph showing the viewing angle luminance distribution, where the index of refraction is 1.4 and the shape of the cross-section of the lens passing the center of the lens unit cell 170 is the first lens curve 200. The horizontal axis indicates the observation angle which is the inclination against the optical axis direction. The vertical axis is the luminance ratio indicating the luminance of a screen corresponding to the observation angle, where the luminance of the screen when observed at the observation angle of 0 degree, that is, from the optical axis direction is one. For the viewing angle luminance distribution of the first lens curve 200, the luminance of the screen when observed at the observation angle of 0 degree, that is, from the optical axis direction is the maximum. Further, at the observation angle of 27 degrees, which is the maximum horizontal viewing angle, a luminance level more than the luminance ratio of 0.5 is realized.

With respect to the shape of the cross-section of the lens, if the distance in the optical axis direction from the intersection of the effective lens surface and the optical axis to the boundary of the cross-section of the lens with an adjacent lens unit cell 170 is larger than the first lens curve 200 and the lens power is stronger than the first lens curve 200, the luminance ratio exceeds one at the observation angle larger than zero degree. In this case, the luminance when the screen is observed from the front is higher than that when observed from an oblique direction, so there is a problem that the viewing angle luminance distribution is unnatural. Further, even if a material of which the index of refraction is larger than 1.4 is selected with respect to the first lens curve 200, the lens power is strong and the luminance ratio exceeds one under the condition that the observation angle is larger than zero. Therefore, in case that the shape of the cross-section of the lens unit cell 170 is the first lens curve 200, it is desirable that a material of which the index of refraction is 1.4 is used. However, if the index of refraction is less than about 1.65, the viewing angle luminance distribution lies within an acceptable range.

Figure 14:
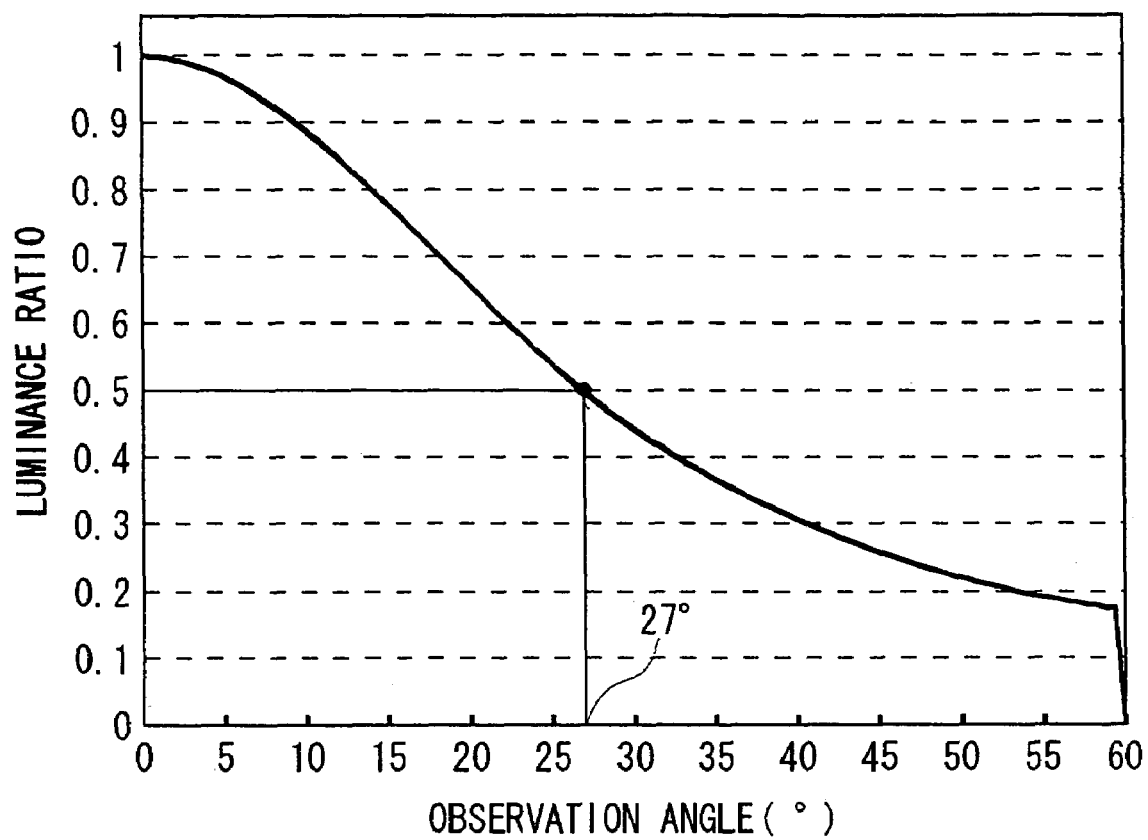
FIG. 14 is a graph showing the viewing angle luminance distribution where the index of refraction is 1.65 with a second lens curve 202.

FIG. 14 is a graph showing the viewing angle luminance distribution where the index of refraction is 1.65 with the second lens curve 202. For the viewing angle luminance distribution of the second lens curve 202, the luminance ratio is 0.5 at the observation angle of 27 degrees which is the maximum horizontal viewing angle. That is, by putting the shape of the cross-section of the lens passing the center of the lens unit cell 170 in the horizontal direction when the screen is used between the first and second lens curves 200 and 202 and forming it to be a convex lens shape in an area including the second lens curve 202, the viewing angle luminance distribution in the horizontal direction can be within a proper range.

Figure 15:
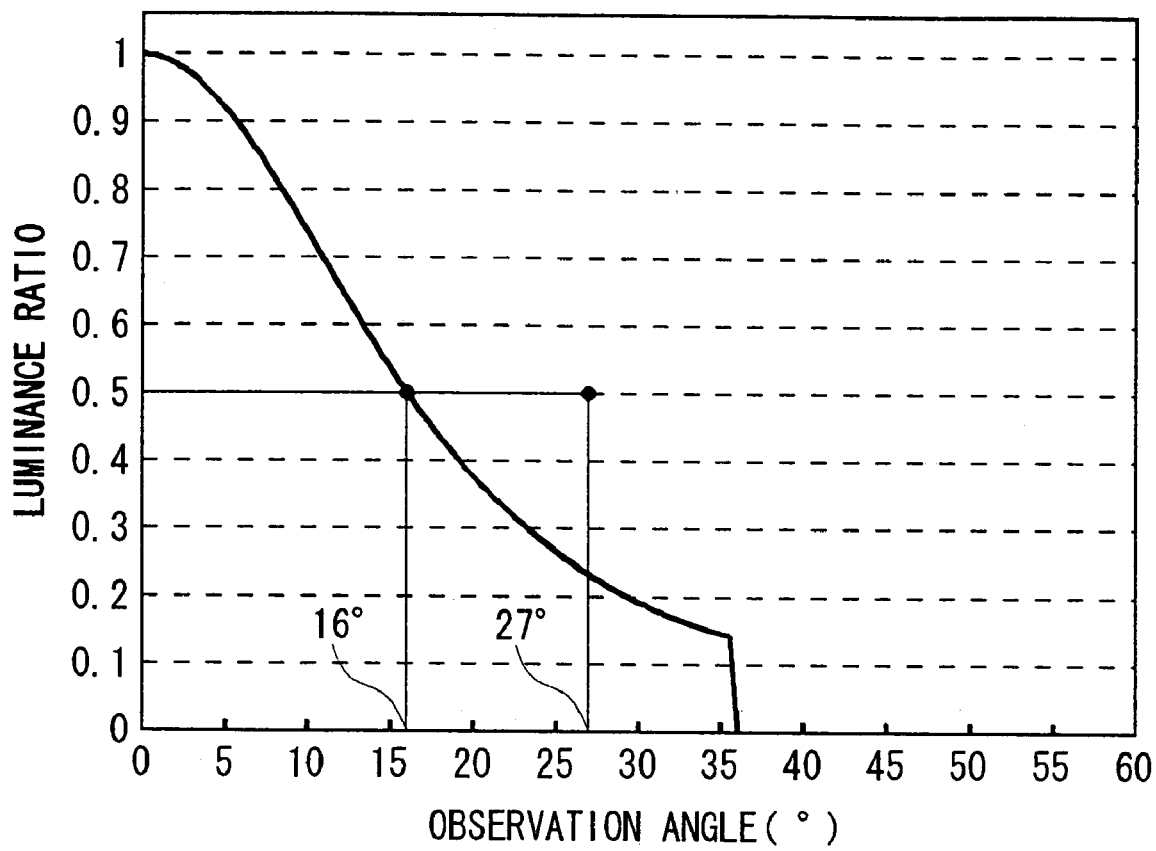
FIG. 15 is a graph showing the viewing angle luminance distribution where the index of refraction is 1.4 with the second lens curve 202.

FIG. 15 is a graph showing the viewing angle luminance distribution where the index of refraction is 1.4 with the second lens curve 202. In this case, the luminance ratio of 0.5 cannot be achieved at the observation angle of 27 degrees which is the maximum horizontal viewing angle. Accordingly, if the shape of the cross-section of the lens unit cell 170 in the horizontal direction is the second lens curve 202, it is desirable that the index of refraction of the lens material is equal to or more than 1.65.

Meanwhile, for the viewing angle luminance distribution where the index of refraction is 1.4 with the second lens curve 202, the luminance ratio of 0.5 can be achieved at the observation angle of 16 degrees which is the maximum vertical viewing angle. Therefore, in case that the second lens curve 202 is taken as the shape of the cross-section of the lens unit cell 170 in the vertical direction, it is possible to achieve a viewing angle luminance distribution having a sufficient level of luminance according to the observation condition in the vertical direction.

Figure 16:
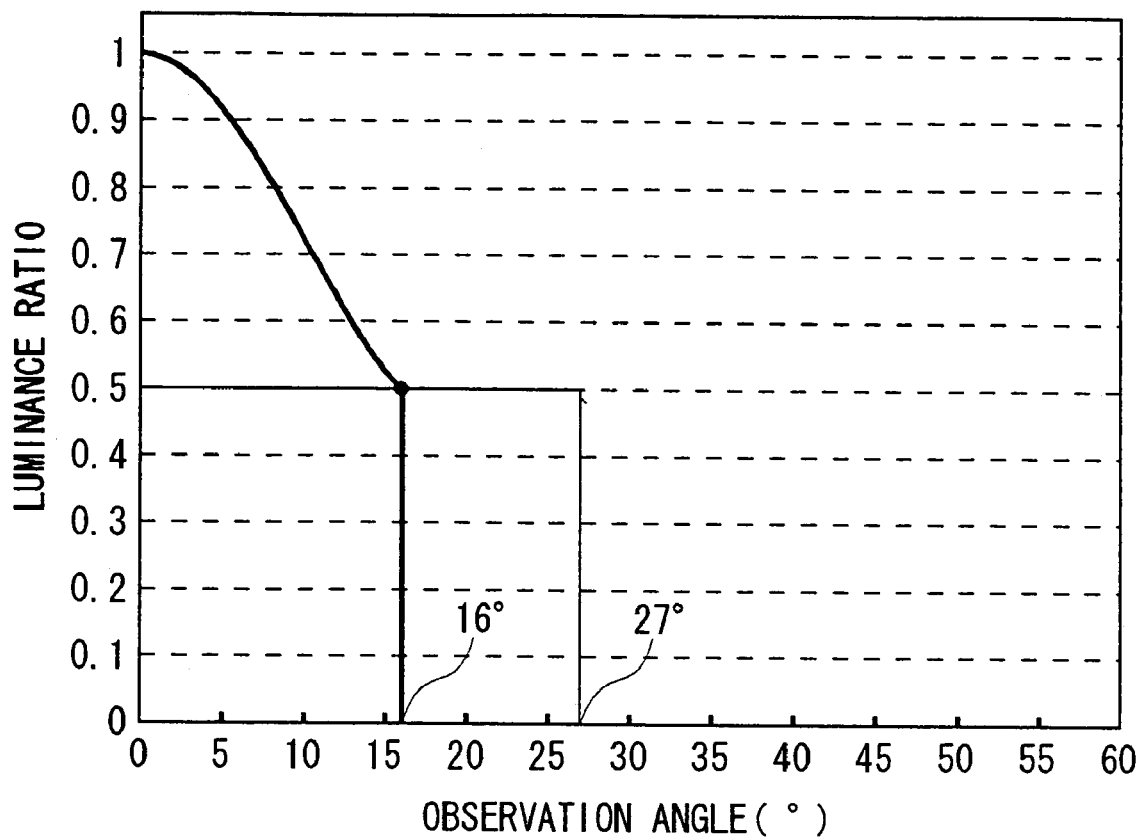
FIG. 16 is a graph showing the viewing angle luminance distribution where the index of refraction is 1.65 with a third lens curve 204.

FIG. 16 is a graph showing the viewing angle luminance distribution where the index of refraction is 1.65 with the third lens curve 204. In this case, the luminance ratio of 0.5 can be achieved at the observation angle of 16 degrees which is the maximum vertical viewing angle. Further, if the index of refraction is smaller than 1.65 with the third lens curve 204, the luminance ratio of 0.5 cannot be achieved at the observation angle of 16 degrees. Accordingly, in case that the shape of the cross-section of the lens unit cell 170 in the vertical direction is the third lens curve 204, it is desirable that the index of refraction of the lens material is equal to or more than 1.65.

That is, by putting the shape of the cross-section of the lens passing the center of the lens unit cell 170 in the vertical direction when the screen is used between the second and third lens curves 202 and 204 and forming it to be a convex lens shape in an area including the second lens curve 202, the viewing angle luminance distribution in the horizontal direction can be within a proper range.

As obvious from the above description, in the transmission type screen 306 of the present embodiment, the viewing angle luminance distribution in the horizontal direction at the time of use is wider in the direction of the observation angle than that in the vertical direction. Moreover, the viewing angle luminance distribution in the vertical direction is restricted to an extent which is neither excessive nor insufficient, as the condition of use of the screen is taken into consideration. Therefore, the transmission type screen 306 can have a proper viewing angle luminance distribution having a high level of luminance in the horizontal and vertical directions.

Figure 17:
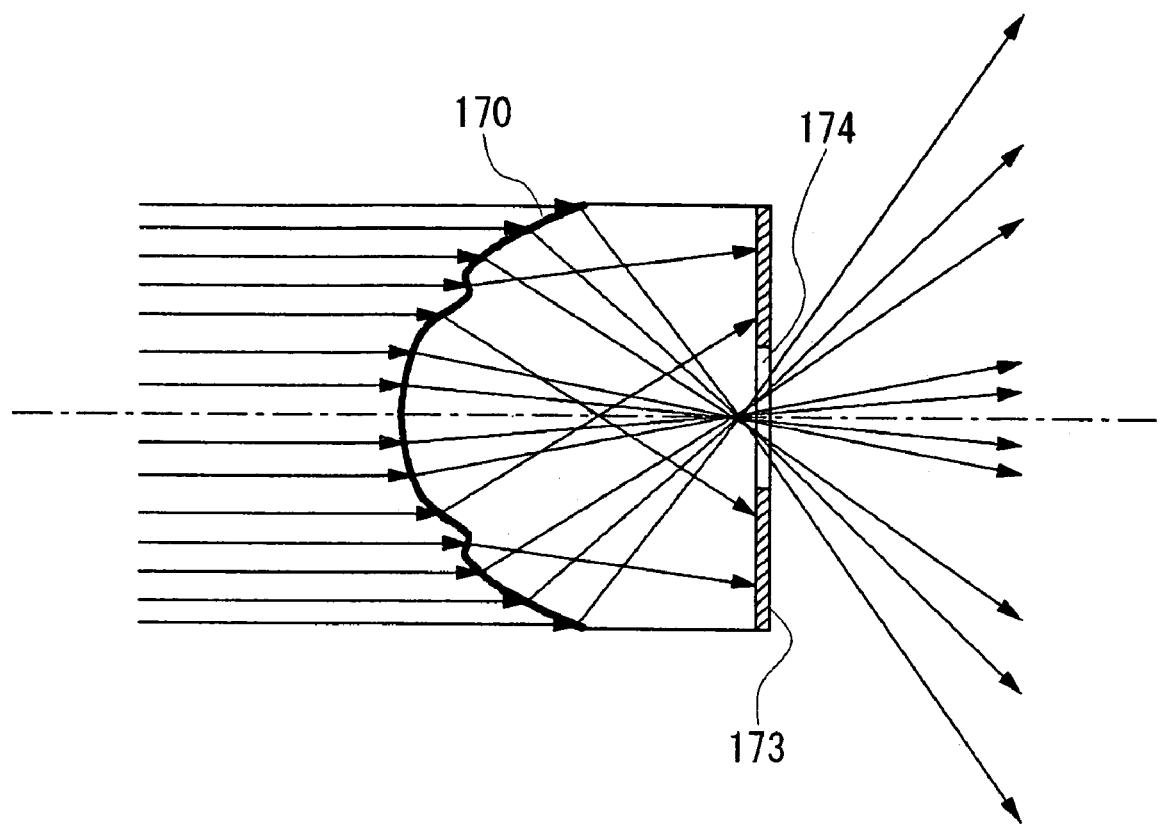
FIG. 17 shows the paths of rays of light if part of the shape of the cross-section of the lens unit cell 170 is dented.
Figure 18:
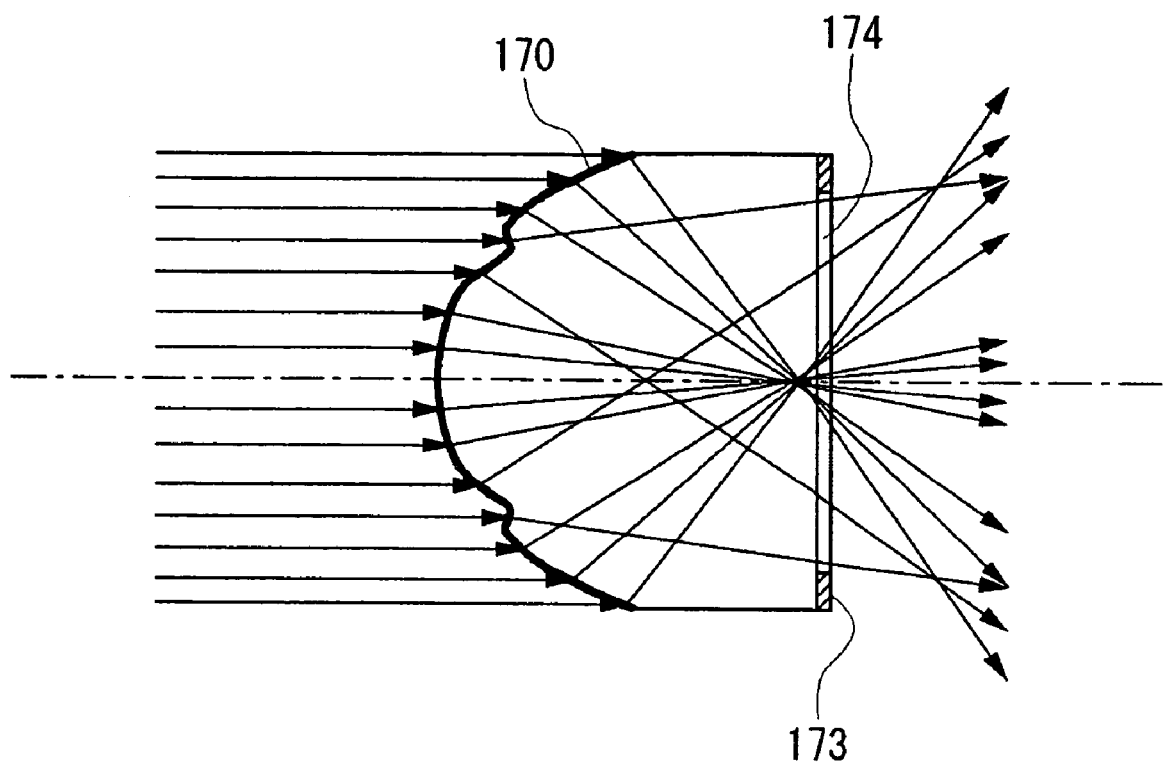
FIG. 18 shows the paths of rays of light when an opening 174 is widened if part of the shape of the cross-section of the lens unit cell 170 is dented.

FIGS. 17 and 18 show the paths of rays of light if part of the shape of the cross-section of the lens unit cell 170 is dented. The light incident on a dented region is not refracted towards the opening 174 but shielded by the light-shielding layer 173 as shown in FIG. 17. Accordingly, the transmission efficiency as a screen decreases, and the luminance of observed light decreases. In this regard, although it is possible to increase the transmission efficiency by enlarging the opening 174 as shown in FIG. 18, at the same time, the function of shielding the external light which causes noise decreases, and there is a problem that the contrast of an image is reduced. Therefore, it is desirable that the shape of the cross-section of the lens unit cell 170 is the shape in the area described above for each of the horizontal and vertical directions, and besides the shape of a certain cross-section of the lens is convex towards the outside.

Figure 19:
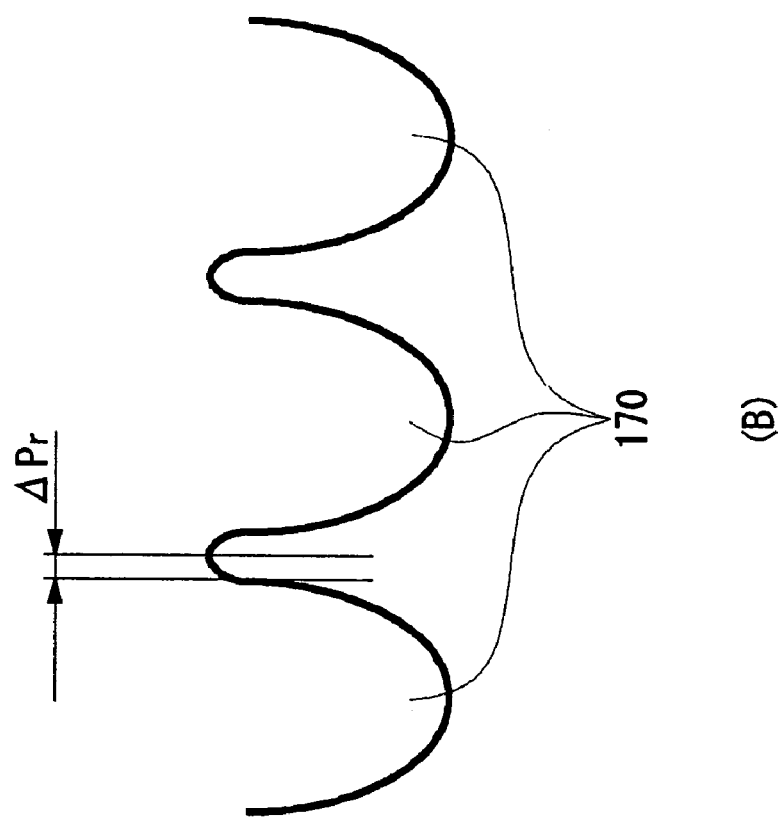
FIG. 19 is a graph showing the shape of a boundary region with an adjacent lens unit cell 170.

FIG. 19 shows the shape of a boundary region with an adjacent lens unit cell 170. Since the fly-eye lens 171 efficiently and selectively emits only the rays of light which should be emitted, it is desirable that the shape of the lens is convex towards the outside to the boundary region of the lens unit cell 170. In this case, however, the boundary region of the lens unit cell 170 is a discontinuous and sharp edge as shown in FIG. 19A. Such sharp edge is the cause of a problem such as a loss of edge when the fly-eye lens unit 308 is manufactured. Therefore, for the boundary of the lens, it is required to connect the boundaries of the lens unit cells 170 so that they become continuous and curved surfaces as shown in FIG. 19B.

However, if the boundaries of the lens unit cells 170 are connected to be continuous and curved surfaces, the rays of light incident on the boundary region cannot pass through the opening 174, and the transmission efficiency decreases. Accordingly, it is desirable that $\Delta P_r$ indicating a range of the boundary region of the lens unit cell 170 has a value which is as small as possible. Although minimum required $\Delta P_r$ changes by the material of the fly-eye lens 171 or the manufacturing method as well, it is desirable that it satisfies the following relation: $\Delta P_r < 1/10 P_r$, where $P_r$ is the lens pitch.

Figure 20:
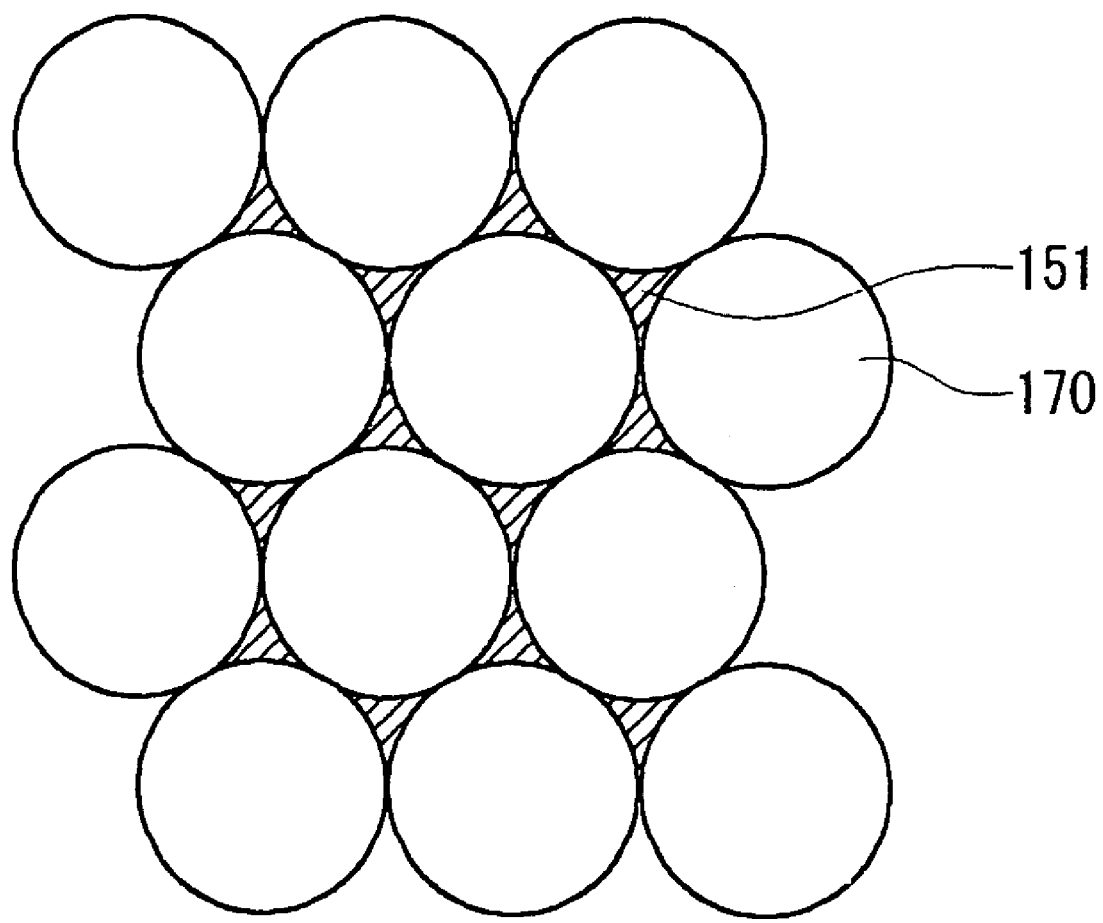
FIG. 20 exemplary shows the arrangement of the lens unit cell 170.

FIG. 20 shows a first arrangement example of the lens unit cell 170. The boundary shape of the lens unit cells 170 in the fly-eye lens 171 is determined by the arrangement of each of the lens unit cells 170. For example, as shown in FIG. 20, if the lens unit cells 170 are arranged so that the boundary shape of the lens unit cells 170 is circular when viewed from the optical axis direction, spaces 151 which are not effective for a lens occur in the fly-eye lens 171. Since the rays of light incident on the spaces 151 are absorbed by the light-shielding layer 173 on the emission side of the fly-eye lens 171, the transmission efficiency of the fly-eye lens 171 is reduced.

However, it is desirable that the spaces 151 are removed by closely arranging the lens unit cell. If the lens unit cells are closely arranged, the boundary shape of the lens unit cell 170 is a polygon according to the arrangement. As the polygon, there are for example a triangle, a quadrangle, a hexagon, an octagon, etc.

Figure 21:
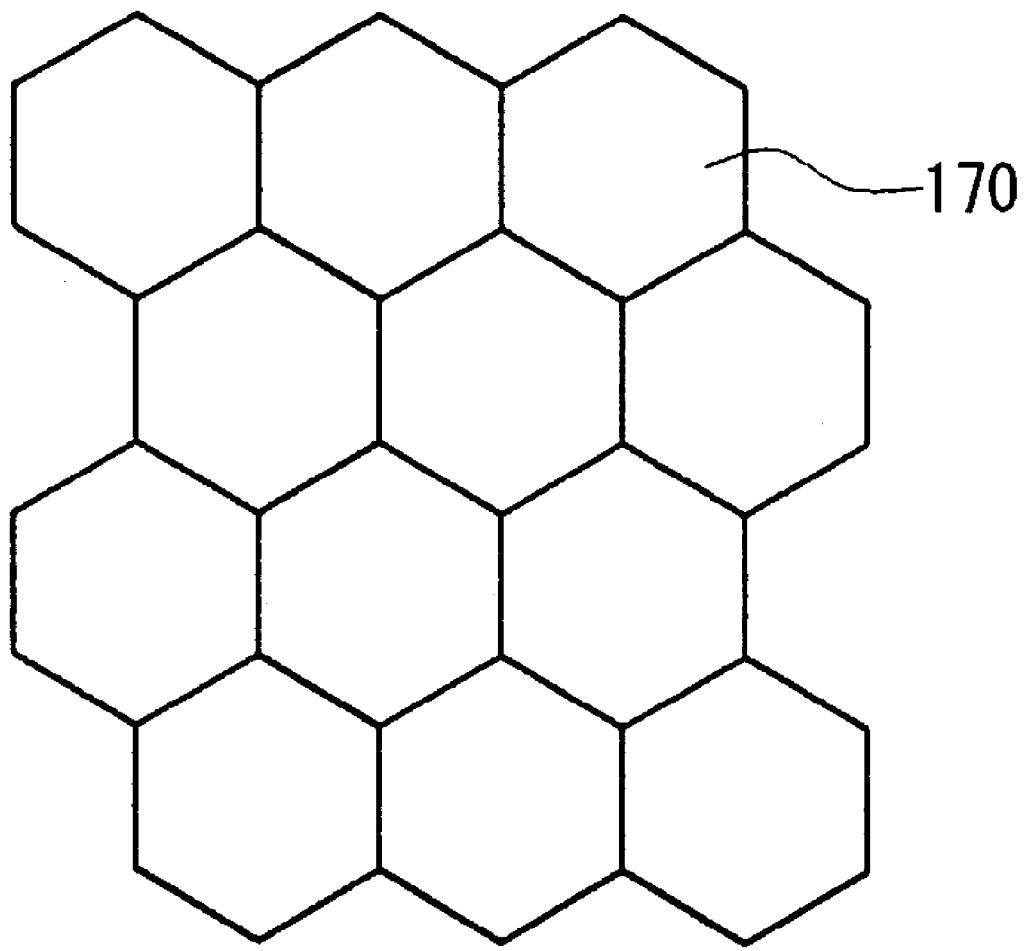
FIG. 21 is a drawing showing the fly-eye lens 171 arranged in the shape of a hexagon viewed from an optical axis direction.
Figure 22:
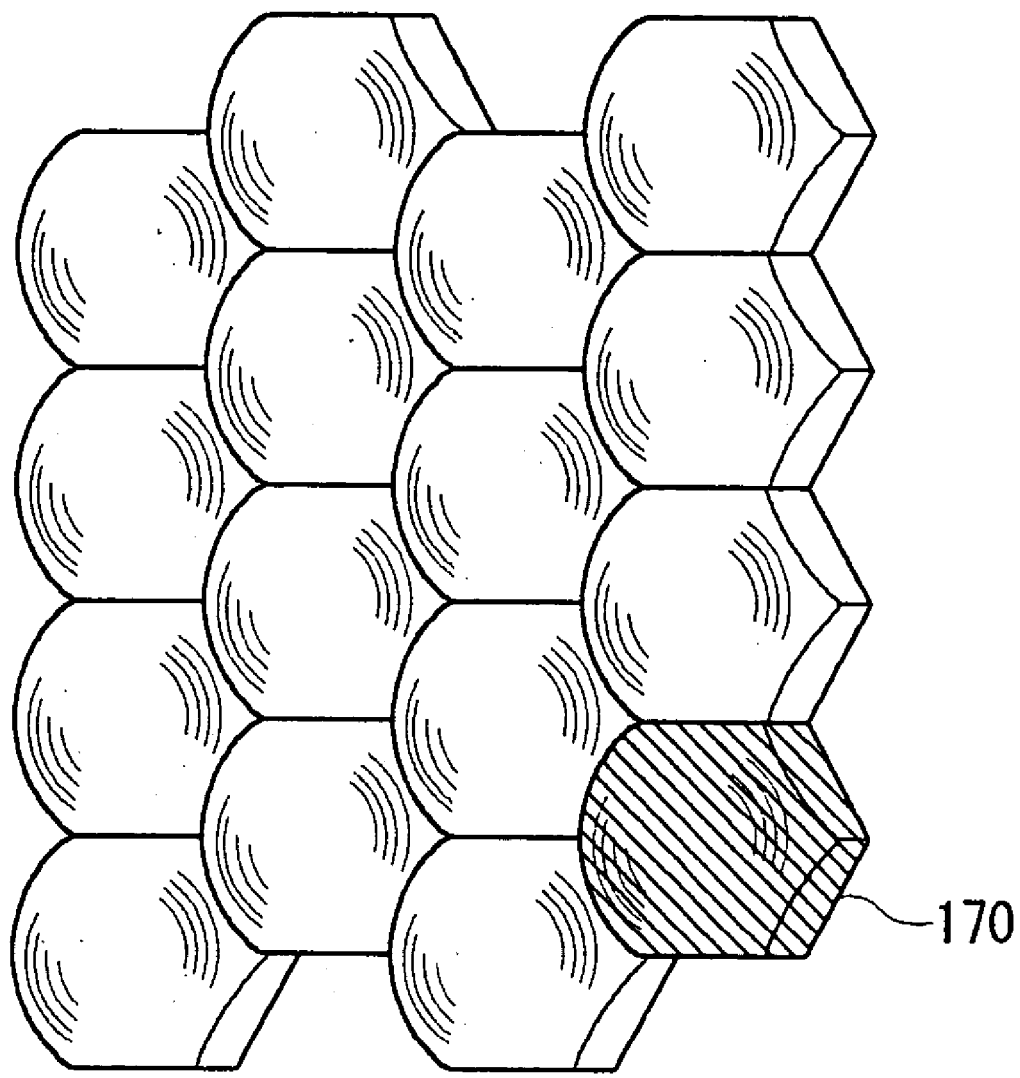
FIG. 22 is a perspective view showing the fly-eye lens 171 arranged in the shape of a hexagon viewed from a direction inclined against the optical axis.

FIGS. 21 and 22 are a drawing showing the fly-eye lens 171 arranged in a hexagonal shape viewed from the optical axis direction and a perspective view thereof viewed from a direction inclined to the optical axis respectively. According to such arrangement, the spaces 151 do not exist and the transmission efficiency is high.

Hereafter, a method for manufacturing the fly-eye lens unit 308 will be described. The method for manufacturing the fly-eye lens unit 308 according to the present embodiment can be realized by applying a conventional method for manufacturing a lenticular lens or Fresnel lens or using a new method described below.

It is desirable that the lens material at least transmits visible light, and the index of refraction thereof ranges from about 1.4 to 1.65. For example, thermosetting resin, photocurable resin, thermoplastic resin, glass, etc. which are well known can be cited. That is, a method of performing molding by filling resin into a female die engraved with the shape of the lens described above, a method of transferring a material filled in a female die to a base material, a method of applying photocurable resin such as ultraviolet curable resin on a base material uniformly, irradiating a part to be formed as a lens with rays of light so that it hardens, and removing an unnecessary part, a method of mechanically tooling a surface of a base material and forming the shape of the lens, a method of combining those methods, etc. can be cited.

The method of performing molding by filling a lens material between a female die and a base material among them is the most efficient and precise, and it is desirable in that the fly-eye lens 171 can be manufactured. That is, as shown in FIG. 3, the base material 172 which is a transparent plastic film is put between the fly-eye lens 171 and the light-shielding layer 173 on an opposite side of the surface of the lens.

As the method for manufacturing the female die, cutting/machining, etching of glass on which masking is partly performed, a photolithography technique, MEMS (Micromachine), etc. are well known, and any of them may be used. In this case, although the female die may be shaped like a plate, it is particularly desirable to use a role-shaped female die in case that the base material 172 is a plastic film having plasticity. In case of a role-shaped female die, it is possible to continuously manufacture the fly-eye lens 171 over a wide area thereof using the base material having plasticity. Accordingly, it is possible to manufacture the fly-eye lens 171 with extremely high efficiency.

Moreover, a method of laminating energy ray curing resin such as ultraviolet curable resin, irradiating only a required part with curing energy rays such as ultraviolet rays so that the desired part hardens, and removing a part which does not harden may be used.

As the lens material, the photocurable resin is the most desirable with regard to productivity, shape precision, simplicity of facilities, etc. In particular, if the base material 172 is a thin plastic film, it is desirable to use the photocurable resin which hardens by rays of light, especially, ultraviolet curable resin as the lens material with regard to curing property, plasticity, flexibility, etc. The properties of photocurable resin can be adjusted by changing a photocurable resin component such as a monomer, prepolymer, polymer, photopolymerization initiator, etc.

Although a monomer and a prepolymer desirably used as one of components composing the photocurable resin basically contains at least one functional group, if curing energy rays which react are ultraviolet rays, in addition to main components, it necessary to add a property of generating ions or radicals by being irradiated with curing energy rays, what is called a photopolymerization initiator.

Here, although the functional group means an atomic group or a bonding mode such as a vinyl group, carboxyl group, hydroxyl group, etc. which is the cause of reaction, one having a vinyl group such as an acryloyl group is desirably used in regard to curing property, because a resin composition hardens by irradiation with curing energy rays in the present invention.

Such monomer having an acryloyl group can be properly selected and used from well-known monomers and is not particularly limited. As a typical example, there are monofunctional one such as 2-ethylhexyl acrylate, 2-hydroxyethyl acrylate, 2-hydroxypropyl acrylate, tetrahydrofuryl and an acrylate derivative thereof, etc., bifunctional one such as dicyclopentenyl acrylate, 1,3-butanediol diacrylate, 1,4-butanediol diacrylate, 1,6-hexanediol diacrylate, diethylene glycol diacrylate, polyethylene glycol diacrylate, (7 hydroxypivalic ester neopentyl glycol) ester and a diacrylate derivative thereof, tripropylene glycol diacrylate, dimethylol tricyclodecane diacrylate, and tri- or higher-functional one such as trimethylolpropane triacrylate, pentaerythritol triacrylate, dipentaerythritol hexaacrylate.

It is desirable to use trifunctional ones or lower among the above monomers from the facts that the film hardness after curing is HB or less so that the plasticity is excellent, the crosslinking density is small and there are many ones with low volume shrinkage, so that the curl resistance is excellent, etc.

In addition to the monomer described above, the prepolymer is often used with the monomer in the present embodiment. The prepolymer used in the present embodiment is not particularly limited like the monomer either. It is typically a polyester acrylate, epoxy acrylate, urethane acrylate, etc., and trifunctional one or lower, desirably, bifunctional or trifunctional one is used in regard to volume shrinkage, plasticity, etc.

Although the photopolymerization initiator is not particularly limited, a carbonyl compound such as acetophenone, benzophene, Michler's ketone, benzyl, benzoin, benzoin ether, benzyldimethylketal, benzoin benzoate, α-acyloxime ester, etc., a sulfur compound such as tetramethylthiuram monosulfide, thioxanthone, etc., a phosphorus compound such as 2,4,6-trimethyl benzoyl diphenyl phosphine oxide, etc. can be typically cited, and those are used alone or in the form of a mixture of two or more of them.

It is desirable that the amount of the photopolymerization initiator to be added is 0.1 to 20 parts by weight, further, 0.5 to 15 parts by weight per 100 parts by weight of a monomer and/or prepolymer component. It is undesirable that if the photopolymerization initiator is less than the above range, the curing property is low, and if it exceeds the range, bleedout occurs after curing.

Moreover, in order to control the characteristics and properties of resin or the characteristics and properties of a cured film before, during and after curing of resin composition in the present embodiment, various additives may be used. Here, as the material for controlling the characteristics and properties before curing, there are a coating stabilizing agent (gelling prevention, curing prevention), a thickening agent (improvement on coating properties), etc. Moreover, as the material for controlling the characteristics during curing, there are a photopolymerization promoter, a light absorbing agent (both are for the adjustment of curing behavior), etc. Further, as the material for controlling the film property after curing, there are a plasticizing agent (improvement on plasticity), an UV-absorbing agent (light resistance), etc.

Here, a polymer may be added with the photocurable resin used in the present embodiment in regard to strength, plasticity, curl resistance, etc. The kind of polymer is not particularly limited, and as a well-known polymer, polyester resin, acryl resin, urethane resin, epoxy resin, etc. can be cited. Among them, it is particularly desirable to use a chlorinated polymer, when considering durability, adhesiveness, etc. The chlorinated polymer can be classified into two types: a polymer of a monomer containing chlorine, e.g., polyvinyl chloridepolyvinyl chloride and a copolymer thereof, polyvinylidene chloride and a copolymer thereof, chloroprene rubber, etc., and so-called a post chlorinated compound obtained by chlorination process on various kinds of polymers, e.g. chlorinated polypropylene, chlorinated polyethylene, ester-chlorinated polyester, chlorinated rubber, chlorinated polyisoprene, etc., and the post chlorinated compound is preferably used in the present embodiment.

Although the method for chlorination of polymer is not particularly limited, a producing method of dissolving rubber or a polymer in a chlorine-based solvent such as carbon tetrachloride, chloroform, etc., performing chlorination at a temperature of 40 to 90 degrees Celsius, and performing processes of distillation, washing and drying, etc. is the most simple. The content of chlorinated polymer is 10 to 100 parts by weight, desirably, 20 to 60 parts by weight per 100 parts by weight of monomer and prepolymer components described above. It is not desirable that if the content is less than the above range, the effect of addition is low, and if it exceeds the range, the photosensitivity of the photocurable resin decreases.

As the base material 172 provided between the fly-eye lens 171 and the light-shielding layer 173 in the present embodiment, a plastic sheet or film is desirably used. Here, as the material of the plastic film, acryl resin, metacryl resin, polystyrene, polyester, polyolefin, polyamide, polycarbonate, polyether, polyimide, polyetheramid, polyamide, polyether sulfone, maleimide resin, polyvinylchloride, poly(meta)acrylic ester, melamine resin, triacetylcellulose resin, norbornenes resin, etc. can be cited. Moreover, although a copolymer thereof, a blended material or further a crosslinked material can be used, a biaxially oriented polyethylene telephtalate film is particularly desirable among polyester films in regard to the difference in optical properties such as transparency, etc. and mechanical strength.

The method for manufacturing the fly-eye lens 171 described above is suitable for a fly-eye lens where the focal length is relatively small to the arrangement pitch, for example, the pitch of the lens unit cell 170 is equal to or less than 200 micrometers and the focal length is equal to or less than 200 micrometers. Particularly, if the pitch of the lens unit cell 170 is equal to or less than 100 micrometers, it is suitable to precisely and stably manufacture a fly-eye lens sheet where the focal length is smaller than the arrangement pitch.

The effective reduction of the reflection of the external light is realized when the opening 174 of the light-shielding layer 173 is accurately arranged at a position matched with the optical axis of the lens unit cell 170. That is, the accuracy of the position of the opening 174 to the optical axis of the lens unit cell 170 is an important factor which dominates the optical properties of the fly-eye lens unit 308. Accordingly, it is necessary to accurately control the position relationship between the lens unit cell 170 and the light-shielding layer 173.

Such problem is solved by cell alignment using a well-known exposure technology. Accordingly, since the opening 174 is formed by cell alignment to the lens unit cell 170, although there is a little change in the measure of the fly-eye lens 171, it is possible to control the position relationship between the fly-eye lens and the light-shielding layer with high precision and ease. Further, since for even a fly-eye lens sheet with a large area which measures over 100 square centimeters it is possible to accurately maintain the position relationship between the opening 174 and the lens unit cell 170, a fly-eye lens sheet which is excellent in transmission efficiency and contrast can be efficiently manufactured.

The parallelism among energy rays emitted on the fly-eye lens 171 and the uniformity within the fly-eye lens surface can be variously selected according to the obtained properties of the fly-eye lens sheet. In order to obtain the intensity distribution of energy rays corresponding to the arrangement pattern of the lens unit cell, an energy ray with parallelism of 6 degrees or less when represented in full width at half maximum is used. Moreover, it is desirable with respect to the uniformity that the minimum of irradiation intensity on an arbitrary 9 points within an irradiation surface is equal to or more than 80% of the maximum thereof.

In this method, however, the paths of irradiated energy rays such as ultraviolet rays and the paths of visible light when practically used are often different according to the wavelength dependence of the index of refraction of the fly-eye lens 171 and the base material 172. In order to correct such difference, a proper degree of diffusion may be given to exposing light, or a method of exposing while scanning a range of ±10 degrees from the optical axis of the lens unit cell 170 may be adopted to carry out in parallel.

In particular, the light-shielding layer 173 with a pattern of the opening 174 is formed by applying photosensitive resin composition (hereafter, also referred to as positive photosensitive resin) where solubility in a solvent increases according to energy rays on an opposite side of the lens surface of the fly-eye lens 171 and dissolving and removing only a photosensitive part by exposure from the lens surface.

In this case, a method of applying shielding positive type photosensitive resin composition with photosensitivity on the opposite side of the lens surface of the fly-eye lens 171 and dissolving and removing an undesired part using a light condensing mechanism by irradiating the lens surface with energy rays perpendicular to the optical axis of the lens unit cell 170 is desirably used. The photosensitive resin composition layer may be either a single layer structure in which the layer itself is the positive photosensitive resin layer with photosensitivity or a laminating structure having at least one layer of positive photosensitive resin and a resin composition layer with photosensitivity. As the latter method in detail, the following method can be adopted:

(1) forming at least one positive photosensitive resin layer as a first layer and resin composition layers with photosensitivity as second and later layers, where the first, second and later layers are sequentially provided from a side exposed to light.

(2) forming a resin composition layer with photosensitivity as the first layer and at least one positive photosensitive resin layer as the second and later layers.

From the fact that development is easy, the method (2) is desirable, and further it is desirable that the resin composition with photosensitivity is dissolved in developer which dissolves and removes the exposed positive photosensitive resin in regard to productivity.

In forming the arrangement pattern of the light-shielding layer with high precision, it is desirable to increase the contrast of exposure strength distribution. Accordingly, although the light-shielding layer 173 is required to be positioned at the focus determined by the lens shape of the lens unit cell 170, it is possible to control the distance between the fly-eye lens 171 and the light-shielding layer 173 with ease and high precision by adjusting the thickness of the base material 172 provided between the fly-eye lens 171 and the light-shielding layer 173. However, the arrangement pattern of the opening 174 can be formed with ease and high precision.

Further, the light-shielding layer 173 is composed of a well-known material such as a metal film, oxide thereof, resin composition added with dye or a coating material, etc. Among them, the resin composition added with dye or a coating material is desirable in that external light causing noise is absorbed. It is desirable that the color of the light-shielding layer 173 is black. For example, it is desirable to use resin composition in which pigment such as carbon black, titanium black, etc. or black dye is dispersed or dissolved. Moreover, in case of using dye, it is desirable to use black dye of which colorfastness to light is 5 or more in regard to light resistance, and most desirable to use azo black dye in regard to dispersibility, compatibility with resin, versatility, etc. Moreover, as the resin component used for dispersing or dissolving the above pigment and dye, a well-known resin such as acryl resin, urethane resin, polyester, novolac resin, polyamide, epoxy resin, etc. can be used.

According to the above manufacturing method, it is possible to obtain the fly-eye lens unit 308 with high precision and higher productivity than that of the conventional method.

Further, the rigidity of the fly-eye lens unit 308 might be insufficient only with the thickness and rigidity of the base material 172. In particular, if a plastic film of 100 or less micrometers for the base material 172, the fly-eye lens sheet extends when tension is applied to support the fly-eye lens 308, so that it is difficult to support it.

Figure 23:
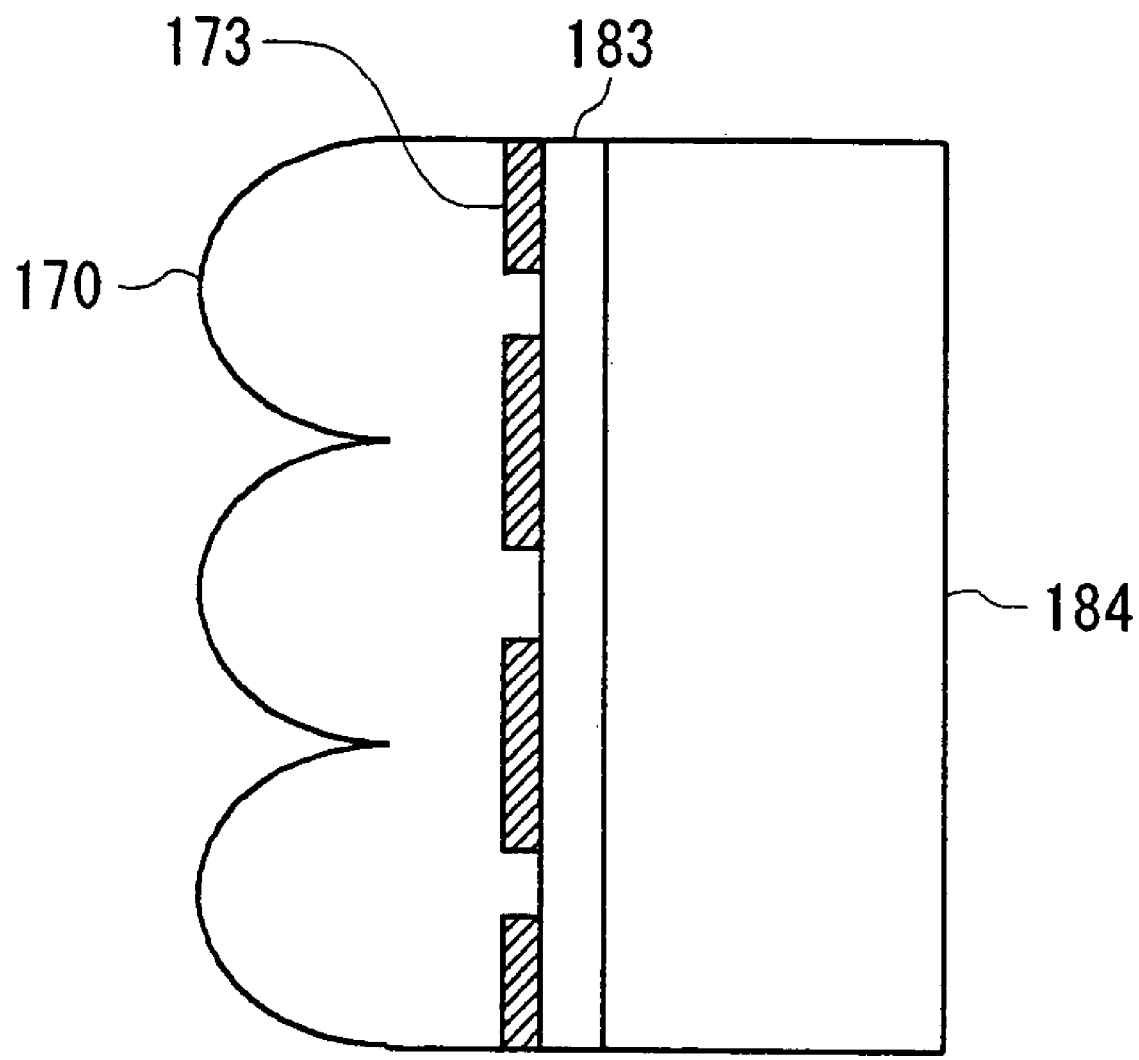
FIG. 23 shows another configuration of the fly-eye lens unit 308.

In this case, as shown in FIG. 23, it is desirable to attach a second transparent support board 184 via an adhesive or adhesion layer 183 to increase the rigidity of the fly-eye lens unit 308. It is desirable that the flexural rigidity of the second transparent support board 184 is equal to or more than that of the first transparent plastic film with regard to the purpose of increasing the rigidity. Here, the flexural rigidity is bending stiffness, and the test method conforms to JIS K-7106. The second transparent support board 184 is a plate-shaped base material which is at least transparent to visible light like the first transparent plastic film, and may be attached to either the light-shielding layer 173-side or the lens surface side of the fly-eye lens 171.

Moreover, in order to reduce reflection, speckle, moiré, etc. of a light source for projecting an image to be projected, the effect of light diffusion may be given to the transparent support board 184 attached to the light-shielding layer-side. In giving light diffusion property to the support board 184, the following methods are well known:

(1) applying a coating material formed by dispersing and mixing an inorganic compound such as $TiO_2$, $SiO_2$ or a high molecular material such as polystyrene in a binder (transparent resin) on a film such as polyester, polycarbonate, acryl, etc. of which transparency is excellent (light transmissivity is 80% or more) and attaching the diffusion film as a diffusion film to a flat surface of the fly-eye lens unit 308.

(2) directly applying a coating material on a flat surface of the fly-eye lens unit 308 without applying and forming it on the film.

(3) dispersing and mixing an inorganic compound, which is not formed as a coating material, into the fly-eye lens 171.

(4) performing a mechanical process such as a mat process or hairline process on an emission surface of the fly-eye lens unit 308.

The support board 184 can provide rigidity to the fly-eye lens 308 as well as protecting the light-shielding layer 173. Moreover, by providing an antireflection coating or antiglare coating on an observer side of the support board 184, it is possible to reduce the reflection of the external light on the screen surface. Consequently, the front plate 312 described in connection with FIG. 2 can be omitted. Providing an antireflection coating on an observer side of the support board 184 is an exemplary embodiment of forming antireflection coating on the emission side of the fly-eye lens unit 308. As another embodiment of forming the antireflection coating on the emission side of the fly-eye lens unit 308, an antireflection coating which directly covers the opening 174 of the light-shielding layer 173 shown in FIG. 3 may be formed by sputtering or deposition.

Figure 24:
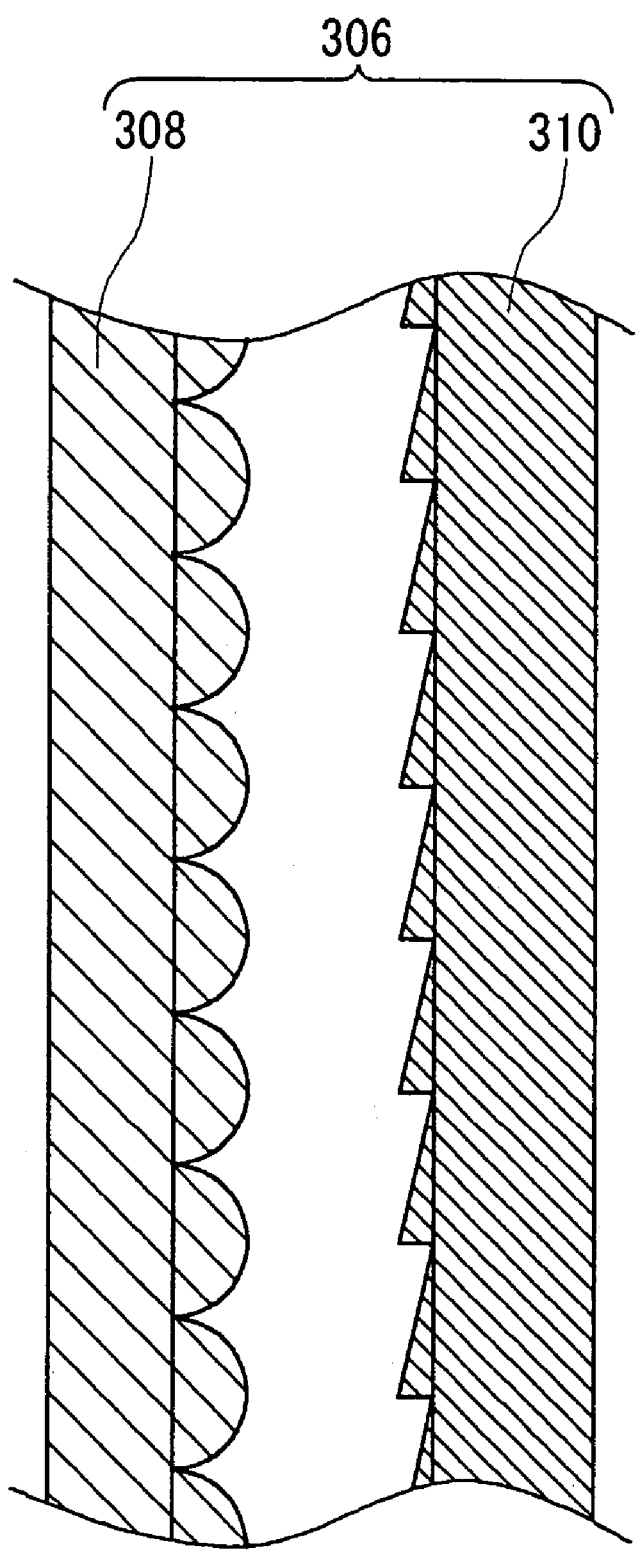
FIG. 24 shows the configuration of the transmission type screen 306 which does not include a front plate 312.

FIG. 24 shows the configuration of the transmission type screen 306 which does not include the front plate 312. An antireflection coating is formed on at least the light emission side (observer side) of the fly-eye lens unit 308 of the transmission type screen 306 in the present embodiment. Accordingly, without the front plate 312, it is possible to reduce the reflection of external light on the screen surface. In addition, by further forming an antireflection coating on the incident side, the reflection of the incident light upon the lens surface of the fly-eye lens unit 308 is reduced, and the transmission efficiency increases. In another embodiment, an antireflection coating is formed only on the incident side of the fly-eye lens unit 308.

In forming the antireflection coating, there is a method of applying or spraying liquid containing antireflection agent onto the fly-eye lens unit 308. Alternatively, by performing deposition, the antireflection agent may be stuck to the fly-eye lens unit 308. According to those methods, it is possible to form an antireflection coating in a desired range of the fly-eye lens unit 308. Moreover, the fly-eye lens unit 308 may be soaked in a liquid substance which contains an antireflection agent to form an antireflection coating by so-called a dipping method. According to the dipping method, it is possible to form antireflection coatings on both sides of the fly-eye lens unit 308 with high efficiency.

Although the present invention has been described by way of exemplary embodiments, it should be understood that those skilled in the art might make many changes and substitutions without departing from the spirit and the scope of the present invention which is defined only by the appended claims.

What is claimed is:

1. A transmission type screen comprising:
   a fly-eye lens comprising lens unit cells each of which has a convex lens shape on one side thereof; and
   a light-shielding layer provided on an opposite side of a lens surface of said fly-eye lens and having a plurality of openings provided near each focus of said lens unit cells,
   wherein a cross-section of each of said lens unit cells in a horizontal direction when said screen is used, the cross-section passing a center of each of said lens unit cells, is an arbitrary convex lens shape with respect to an area provided between a first lens curve, wherein when uniform light parallel to an optical axis of said lens unit cell is incident upon the lens surface, luminance on an emission side of said screen is highest in an optical axis direction of said lens unit cell, and a distance in the optical axis direction on the cross-section of said lens unit cell from an intersection between an effective lens surface of said lens unit cell and the optical axis to a boundary with an adjacent one of said lens unit cells is longest, and a second lens curve, wherein when said screen is observed on the emission side, luminance when said screen is observed from a direction inclined against the optical axis direction by a maximum horizontal viewing angle predetermined in a horizontal direction is a proportion of a reference, which is less than one, to luminance when said screen is observed from the optical axis direction, the area including the second lens curve, and
   a cross-section of each of said lens unit cells in a vertical direction when said screen is used, the cross-section passing the center of each of said lens unit cells, is an arbitrary convex lens shape with respect to an area provided between the second lens curve and a third lens curve, wherein when uniform light parallel to the optical axis is incident upon the lens surface, luminance on the emission side when said screen is observed from a direction inclined against the optical axis direction by a maximum vertical viewing angle, which is predetermined in the vertical direction and less than the maximum horizontal viewing angle, is a proportion of the reference as compared to the luminance when the screen is observed from the optical axis direction, the area not including the second lens curve.

2. A transmission type screen as claimed in claim 1, wherein the maximum horizontal viewing angle is 27 degrees, the maximum vertical viewing angle is 16 degrees, and the proportion of the reference is 50%.

3. A transmission type screen as claimed in claim 1, wherein the first lens curve corresponds to a lens shape when a material of transparent plastic of which the index of refraction is relatively small is used for said fly-eye lens.

4. A transmission type screen as claimed in claim 3, wherein the minimum index of refraction of a material which can be used for the fly-eye lens is 1.4.

5. A transmission type screen as claimed in claim 1, wherein the second lens curve corresponds to a lens shape when a material of transparent plastic of which the index of refraction is relatively large is used for said fly-eye lens.

6. A transmission type screen as claimed in claim 5, wherein the index of refraction of the material used for said fly-eye lens is 1.65.

7. A transmission type screen as claimed in claim 1, wherein the third lens curve corresponds to a lens shape when a material of transparent plastic of which the index of refraction is relatively large is used for said fly-eye lens.

8. A transmission type screen as claimed in claim 1, wherein if a material of transparent plastic of which the index of refraction is relatively small is used for said fly-eye lens, the second lens curve is a lens shape in which the luminance when said screen is observed at a maximum viewing angle in the vertical direction is equal to or more than the proportion of the reference as compared to the luminance when observed from the optical axis direction.

9. The transmission type screen as claimed in claim 8, wherein the minimum index of refraction of a material which can be used for the fly-eye lens is 1.4.

10. A transmission type screen as claimed in claim 1, wherein if a lens pitch of said fly-eye lens and a distance from a central axis of each of said lens unit cells are represented by Pr and r respectively, the first, second and third lens curves are respectively defined as each of first, second and third parameter groups shown in the following table and the following equation:

$$z_r = \sum_{k=1}^{15} a_k \left(\frac{1}{P_r}\right)^{2k-1} r^{2k}$$

| | $a_k$ | | |
|---|---|---|---|
| k | 1st parameter groups (defining 1st lens curve) | 2nd parameter groups (defining 2nd lens curve) | 3rd parameter groups (defining 3rd lens curve) |
| 1 | 1.852E+00 | 7.692E−01 | 3.448E−01 |
| 2 | 1.842E+00 | 6.827E−01 | 1.435E−01 |
| 3 | 3.663E+00 | 1.212E+00 | 1.194E−01 |
| 4 | 9.108E+00 | 2.689E+00 | 1.243E−01 |
| 5 | 2.536E+01 | 6.683E+00 | 1.448E−01 |
| 6 | 7.567E+01 | 1.780E+01 | 1.808E−01 |
| 7 | 2.365E+02 | 4.964E+01 | 2.365E−01 |
| 8 | 7.644E+02 | 1.432E+02 | 3.199E−01 |
| 9 | 2.534E+03 | 4.237E+02 | 4.437E−01 |
| 10 | 8.569E+03 | 1.279E+03 | 6.279E−01 |
| 11 | 2.944E+04 | 3.920E+03 | 9.027E−01 |
| 12 | 1.025E+05 | 1.218E+04 | 1.315E+00 |
| 13 | 3.606E+05 | 3.825E+04 | 1.936E+00 |
| 14 | 1.281E+06 | 1.212E+05 | 2.878E+00 |
| 15 | 4.585E+06 | 3.874E+05 | 4.312E+00 |

-continued $$z_r = \sum_{k=1}^{15} a_k \left(\frac{1}{P_r}\right)^{2k-1} r^{2k}$$

where, $Z_r$ is a distance from a vertex of said lens in the optical axis direction, and k is a number ranging from 1 to 15 corresponding to each of items in the above table.

11. A transmission type screen as claimed in claim 1 further comprising a Fresnel lens facing the lens surface of said fly-eye lens.

12. A transmission type screen as claimed in claim 1, wherein an antireflection coating is formed on the emission side of said fly-eye lens.

13. A transmission type screen as claimed in claim 12, wherein an antireflection coating is further formed on the incident side of said fly-eye lens.

14. A transmission type screen as claimed in claim 1, wherein an antireflection coating is formed on the incident side of said fly-eye lens.

* * * * *